United States Patent [19]

Alkon et al.

[11] Patent Number: 5,222,195

[45] Date of Patent: Jun. 22, 1993

[54] DYNAMICALLY STABLE ASSOCIATIVE LEARNING NEURAL SYSTEM WITH ONE FIXED WEIGHT

[75] Inventors: Daniel L. Alkon; Thomas P. Vogl, both of Bethesda; Kim L. Blackwell, Rockville, all of Md.

[73] Assignees: United States of America, Washington, D.C.; Environmental Research Institute of Michigan, Ann Arbor, Mich.

[21] Appl. No.: 864,337

[22] Filed: Apr. 6, 1992

Related U.S. Application Data

[63] Continuation of Ser. No. 524,319, May 17, 1990, which is a continuation-in-part of Ser. No. 448,090, Dec. 12, 1989, Pat. No. 5,119,469, which is a continuation-in-part of Ser. No. 353,107, May 17, 1989, abandoned.

[51] Int. Cl.⁵ .............................................. G06F 15/18
[52] U.S. Cl. ......................................... 395/24; 395/27
[58] Field of Search ............... 395/24, 22, 27; 382/14, 382/15

[56] References Cited

U.S. PATENT DOCUMENTS

| | | | |
|---|---|---|---|
| 3,950,733 | 4/1976 | Cooper et al. | 364/513 |
| 4,044,243 | 8/1977 | Cooper et al. | 364/513 |
| 4,254,474 | 5/1981 | Cooper et al. | 364/513 |
| 4,326,259 | 4/1982 | Cooper et al. | 364/513 |
| 4,518,866 | 5/1985 | Clymer | 364/513 |
| 4,660,166 | 4/1987 | Hopfield et al. | 364/513 |
| 4,773,024 | 9/1988 | Faggin et al. | 364/513 |
| 4,802,103 | 6/1986 | Faggin et al. | 364/513 |

OTHER PUBLICATIONS

R. P. Lippmann, "An Introduction to Neural Nets";, IEEE ASSP, Magazine, pp. 4-21, Apr., 1987.

*Primary Examiner*—Allen R. MacDonald
*Attorney, Agent, or Firm*—Cushman, Darby & Cushman

[57] ABSTRACT

A dynamically stable associative learning neural network system include a plurality of synapses (122, 22-28), a non-linear function circuit (30) and an adaptive weight circuit (150) for adjusting the weight of each synapse based upon the present signal and the prior history of signals applied to the input of the particular synapse and the present signal and the prior history of signals applied to the input of a predetermined set of other collateral synapses. A flow-through neuron circuit (1110) embodiment includes a flow-through synapse (122) having a predetermined fixed weight. A neural network is formed by a set of flow-through neuron circuits connected by flow-through synapses to form separate paths between each input (215) and a corresponding output (245). In one embodiment (200), the neuron network is initialized by setting the adjustable synapses at some value near the minimum weight and setting the flow-through neuron circuits at some arbitrarily high weight. The neural network embodiments are taught by successively application of sets of inputs signals to the input terminals until a dynamic equilibrium is reached.

3 Claims, 12 Drawing Sheets

ADAPTIVE WEIGHT CIRCUIT

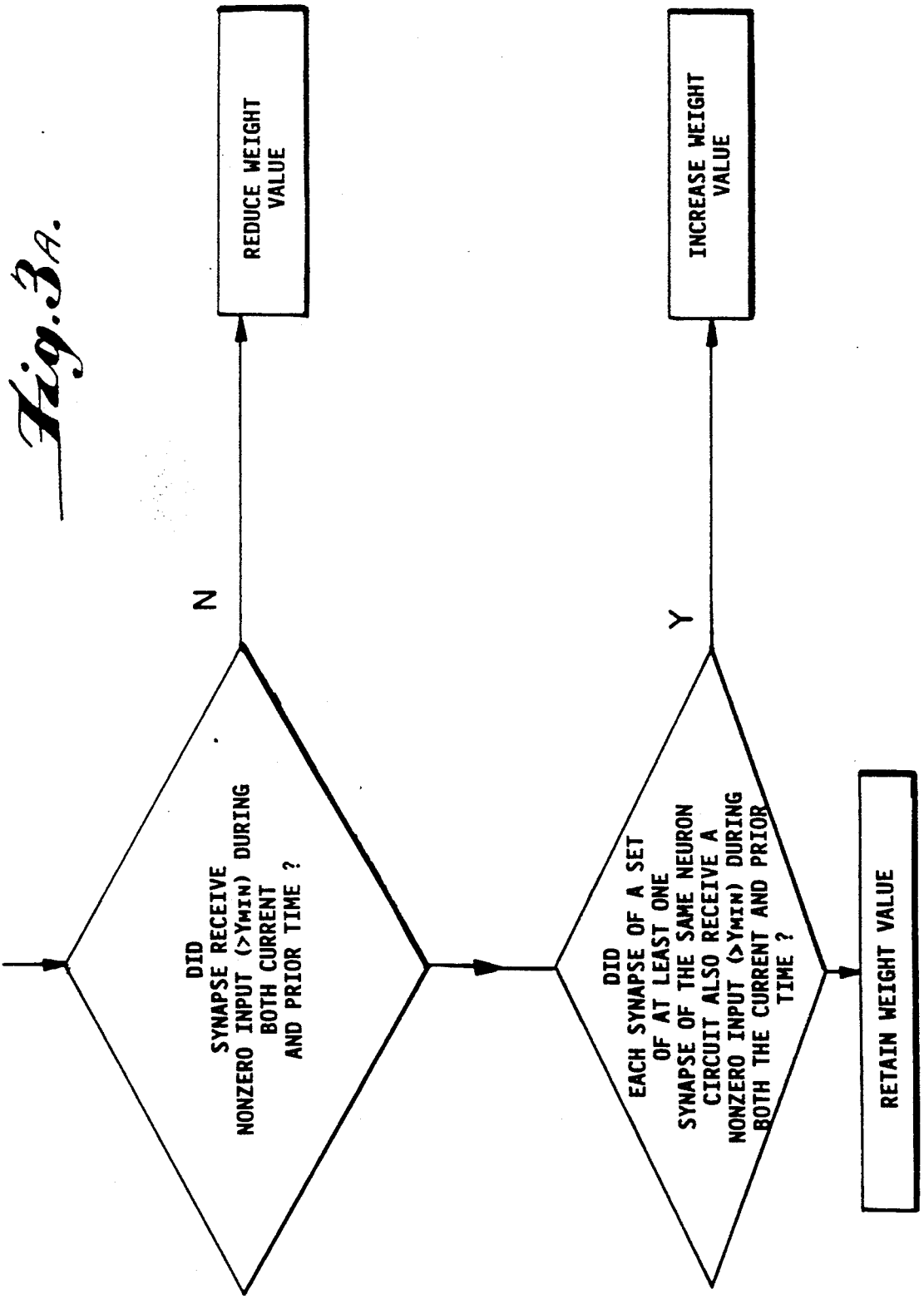

DYNAMICALLY STABLE ASSOCIATIVE LEARNING NEURAL SYSTEM WITH ONE FIXED WEIGHT

CROSS REFERENCE TO RELATED APPLICATIONS

This is a continuation of U.S. patent application Ser. No. 07/524,319, filed May 17, 1990 which is a continuation-in-part of co-pending and commonly owned U.S. patent application Ser. No. 07/448,090 filed Dec. 12, 1989 now U.S. Pat. No. 5,119,469 and entitled "Dynamically Stable Associative Learning Neural Network Systems" and U.S. patent application No. 07/353,107 filed May 17, 1989 now abandoned and entitled "Dynamically Stable Associative Learning Neuron Circuit and Neural Network."

TECHNICAL FIELD

The present invention relates to a dynamically stable associative learning neural network system involving neuron circuits and networks and, more particularly, to a neuron circuit and an organizations thereof which employ a novel learning rule and which enables associative learning, including correlations and anti-correlations, with decreased computational time and complexity.

BACKGROUND ART

Efforts have been made to use neural networks to emulate human-like performance in the areas of pattern recognition including pattern-recognition applications in speech or image recognition, classification systems, and adaptive control systems. The basic computational element of a neural network is the neuron circuit which typically has multiple input lines and a single output line. The output response of a neuron circuit is generally a nonlinear function of the sum of the signal amplitudes on its input lines, with an output response being triggered when the sum of the input signal amplitudes exceeds a threshold value. The output of a neuron circuit may be coupled to the input of more than one other neuron circuit.

A neural network is formed by interconnecting the neuron circuits through synapses, each of which has an associated weight for modifying any signal passing through it. The amplitude of a signal exiting a synapse is thus the product of the weight associated with that synapse and the amplitude of the signal entering the synapse. A synapse may be either excitatory, that is, its weight is positive because it contributes to production of a signal by the associated neuron circuit, or inhibitory, that is, its weight is negative.

The output end of each synapse terminates at an input line to a neuron circuit, with the other end connected to either the output line of another neuron circuit or to a primary input (i.e., the receptor) to the neural network. The primary outputs of a neural network are each derived from a single output line of one of the neuron circuits in the system. With such loose restrictions, a large number of differently configured neural networks can be formed by simply varying the synaptic connections between neuron circuits.

The two major classes of artificial neural networks developed are (1) single layer networks in which a set of neuronal elements are fully interconnected with each other and which function well as associators, and (2) multilayer perceptrons in which all interconnections are feed-forward connections between layers and which function well as pattern classifiers. For the networks in these two classes, the basic neuronal models used are variants of a concept in which (1) "synaptic" inputs to an element are summed and the element fires if a threshold is exceeded, and (2) the weight or strength of a synaptic junction is increased only if both the presynaptic and post-synaptic elements fire. Essentially, all of the currently popular neural network designs implicitly or explicitly use the output of a neuronal element in the adjustment of the weights on its input. In most implementations, a nonlinear optimization or relaxation algorithm is used for setting weights. These algorithms are all computationally intensive, since for each set of inputs to be learned many iterations are required before convergence is achieved and the network has learned the input patterns. Depending on the details of the implementation, the computational complexity of these algorithms (reflected in the number of iterations needed to achieve convergence) is between $O(N^2)$ and $O(N^3)$ where N is the number of weights (connections) to be determined. Consequently, the total computational effort per connection increases as the number of connections is increased. A survey of neural networks can be found in R. P. Lippmann, "An Introduction to Neural Nets," IEEE ASSP Magazine, Pgs. 4-21, April, 1987).

Neural networks are taught by successive presentation of sets of signals to their primary inputs with each signal set derived from a pattern belonging to a class of patterns, all having some common features or characteristics. Each time a set of signals is presented to the primary inputs, the synaptic weights must be adapted in order for the neural network to learn from this input.

The primary disadvantages associated with prior art neural networks result from their methods of adapting synaptic weights when the neural networks are in the training mode. Essentially, conventional neural network designs implicitly or explicitly use the output response of a given neuron circuit in adjusting the weights of the synapses connected to its input lines (see, for example, U.S. Pat. No. 3,950,733 issued Apr. 13, 1976 to Cooper et al). The use of the output response requires nonlinear optimization or relaxation algorithms which are computationally intensive; for a relatively small network of neuron circuits, thousands or ten of thousands of iterations are typically required before convergence is achieved and the network is said to have learned a set of input patterns. As the number of neuron circuits increase, the computational time to achieve convergence increases faster than linearly in some cases and at an exponential rate in other cases.

Additionally, most neural networks require an external teacher that provides the neural network with a desired set of output values chosen to represent the class of patterns being learned. Sets of signals representing the exemplary input patterns are successively applied to the primary inputs and propagate through the neural network to the output. The differences between the actual and desired output values, determined by the external teacher, are calculated to arrive at an error signal that is employed, typically with a nonlinear algorithm, throughout the network to adjust synaptic weights. This process is repeated in a recurring manner and typically requires a large number of iterations to reduce errors appearing at the primary outputs to an acceptable level.

DISCLOSURE OF INVENTION

The present invention provides a dynamically stable associative learning neural elements and organizations thereof which network system, which, in its general form, provides for the separation of the unconditioned stimuli and conditioned stimuli pathways into two separate input streams, dendritic "patches," and, in one form, 'interneurons'. The system learns anti-correlations as well as correlations among input signals, and the implementation of dendritic "patches" model the local interaction of unconditioned stimuli and conditioned stimuli pathways during associative learning. The pathway for the unconditioned stimuli pattern is separated and distinct from the pathway for the conditioned stimuli pattern, and, in order to induce associative learning, the unconditioned stimuli pattern is presented together with the conditioned stimuli pattern. After the association has been learned, presentation of the conditioned stimuli input alone will elicit, as the output of the network, that unconditioned stimuli with which that conditioned stimuli has previously been associated. In order for the network to actively learn "anti-correlations", i.e., a signal in one pathway is associated with the lack of a signal in another pathway, every direct excitatory connection from a conditioned stimuli input neuron to an output neuron is supplemented by a parallel "indirect" connection.

A neural-function circuit for use in a correlation only network includes a plurality of synapse-function circuits, each synapse having a synaptic weight for producing a signal output proportional to the product of the input signal and the weight of that synapse. A nonlinear function circuit, such as a step, threshold, or sigmoid function circuit, sums the outputs of each synapse and produces a nonlinear summation output. An adaptive weight circuit is provided for adjusting the weight of each synapse based upon the current signal and at least one prior signal applied to the input of the particular synapse and the current signal and at least one prior signal applied to the input of a predetermined set of other synapses. The weight of a synapse is increased if and only if that particular synapse and a predetermined set of other synapses all receive nonzero signals on their respective synaptic inputs for both the current time and the immediately preceding time. The weight of a synapse is unchanged and thus retained if and only if the particular synapse receives nonzero signals on its inputs for both the current time and the immediately preceding time and the predetermined set of other synapses do not all receive nonzero signals on their respective synaptic inputs for both the current time and the immediately preceding time. In all other cases the adaptive weight circuit reduces the weight of the particular synapse.

A neural-function circuit for use in a correlation and anti-correlation network includes a plurality of synapse-function circuits, each synapse having a synaptic weight for producing a signal output proportional to the product of the input signal and the weight of that synapse. A non-linear function circuit, such as a step, threshold, or sigmoid function circuit, sums the outputs of each synapse and produces a nonlinear summation output. At least one of the synapse-function circuits, termed a flow-through synapse, has a predetermined, fixed weight value, and the other synapses are connected to an adaptive weight circuit that adjusts the weight of each synapse based upon the current signal and at least one prior signal applied to the input of the particular synapse and the current signal and at least one prior signal applied to the input of a predetermined set of other synapses. The weight of an adaptive synapse is increased if and only if that particular synapse and a predetermined set of other synapses all receive nonzero signals on their respective synaptic inputs for both the current time and the immediately preceding time. The weight of a synapse is unchanged and thus retained if and only if the particular synapse receives nonzero signals on its inputs for both the current time and the immediately preceding time and the predetermined set of other synapses do not all receive nonzero signals on their respective synaptic inputs for both the current time and the immediately preceding time. In all other cases the adaptive weight circuit reduces the weight of the particular synapse.

In the preferred embodiments, the weight values associated with each adaptable synapse can be varied between a predetermined maximum weight value and a minimum weight value. When the weight is increased, the amount of the increase is proportional to the difference between the prior weight and the maximum weight value, and, when the weight is decreased, the amount of the decrease is proportional to the difference between the prior weight and the minimum weight value.

A neural network capable of learning both correlations and anti-correlations is formed with neuron circuits of the adaptive and flow-through types and includes a plurality of inputs terminals and a plurality of output terminals. At least one layer of both adaptive and flow-through neuron-function circuits are connected between the input terminals and the output terminals with flow-through neuron circuits connected by flow-through synapses to form separate and direct unconditioned stimuli paths between each input terminal and a corresponding output terminal. The flow-through neuron circuits are connected to adaptive-weight synapses circuits to permit correlative learning. In a multilayer embodiment, a flow-through neural-function circuit can receive only a single connection from another flow-through synapse in its receptive field.

The neural network is initialized by setting the adjustable weight synapses at some value near the minimum weight with each the fixed weight of each flow-through synapse set near the maximum value, for example, 0.91. This value is set so that the inputs will not propagate to the outputs without additional stimulation from collateral neuron circuits, that is, neuron circuits not on the principal flow-through path. The neural network is taught by successive application of sets of input signals to the input terminals until a dynamic equilibrium is reached. With each successive application of the training set, the adaptable neural-function circuit adapts their weight values in accordance with the learning rule until a dynamic equilibrium is reached in which the sum of the weight increases and the weight decreases over a set of input presentations is zero or near zero.

A more generalized embodiment of the network incorporates the implementation of 'interneurons' that allow the system to learn anti-correlations as well as correlations among input signals, the implementation of dendritic "patches" that model the local interaction of unconditioned stimuli and conditioned stimuli pathways during associative learning, and the separation of the unconditioned stimuli and conditioned stimuli pathways into two separate input streams. The pathway for the unconditioned stimuli pattern is separate and distinct from the pathway for the conditioned stimuli pattern, and, in order to induce associative learning, the unconditioned stimuli pattern is presented together with the conditioned stimuli pattern (each to their own input neurons). After the association has been learned, presentation of the conditioned stimuli input alone will elicit, as the output of the network, that unconditioned stimuli with which that conditioned stimuli has previously been associated. In order for the network to actively learn "anti-correlations", i.e., a signal in one pathway is associated with the lack of a signal in another pathway, every direct excitatory connection from a conditioned stimuli input neuron to an output neuron is supplemented by a parallel "indirect" connection. To this end, the conditioned stimuli input neuron is indirectly connected to the output neuron via an inhibitory connection to an interneuronal element with spontaneous activity which, in turn, has an excitatory connection to the output neuron. To permit the network to learn the patterns of its input signals, rather than learning the signals from each individual input, "patches" on the "dendritic membrane" reflect a pattern of activity on the input neurons and weights are associated with each patch rather than with each connection and represent how well the neuron has learned the patch pattern. The introduction of patches permits recognition, and therefore separation, of the patterns of incoming signals, i.e., recognition of which independent combination is being activated.

In an extension of the network suitable for gray-scale Pattern recognition, patch information is stored as multi-bit values and the similarity between patch vectors and and input pattern is computed using a geometrically specific function of the stored patch vector and the input signal pattern transmitted by the direct connection. A suitable function includes Pearson's R which provides a range between $-1$ and 1 (inclusive) that provides a measure of correlation, with 1 indicating complete correlation, a $-1$ indicating negative correlation, and a zero representing no correlation. Since the similarity-computation uses the input signal transmitted by the direct connection, only patch information is required to thus dispense with interneurons and indirect connections. The signal propagated is a function of the computed similarity between the patch vector and the input pattern and all patches above a computed-similarity threshold participate in signal propagation. In the extended network, the learning rule for calculating the weight on the patch includes storing a moving average of the unconditioned stimuli signal to allow gray scale values to be learned, distinguished, and reproduced. Additionally, the frequency of use of each patch is determined and, where the frequency of use is below a certain value, that patch is removed. One advantage of the extended network is that each output neuron may be connected to all elements of its receptive field or it may be connected to each of a subset of input elements.

The present invention advantageously provides a dynamically stable associative learning neural network system that associatively learns both correlations and anti-correlations, that can be configured to classify or restore patterns simply by changing the number of output units, in which the computational effort scales linearly in complexity with the number of connections, in which neither global nor local feedback connection are required during learning, and in which superior gray-scale pattern recognition can be obtained.

BRIEF DESCRIPTION OF THE DRAWINGS

The present invention is described below, by way of example, with reference to the accompanying drawings, wherein:

FIG. 3A is a flow diagram illustrating, in schematic form, of the synaptic-weight training rule for the adaptive weight circuit of FIG. 3;

FIG. 17 is a generalized view of an exemplary application of any of the disclosed embodiment of the neural network.

Best Mode for Carrying Out the Invention

Figure 1:
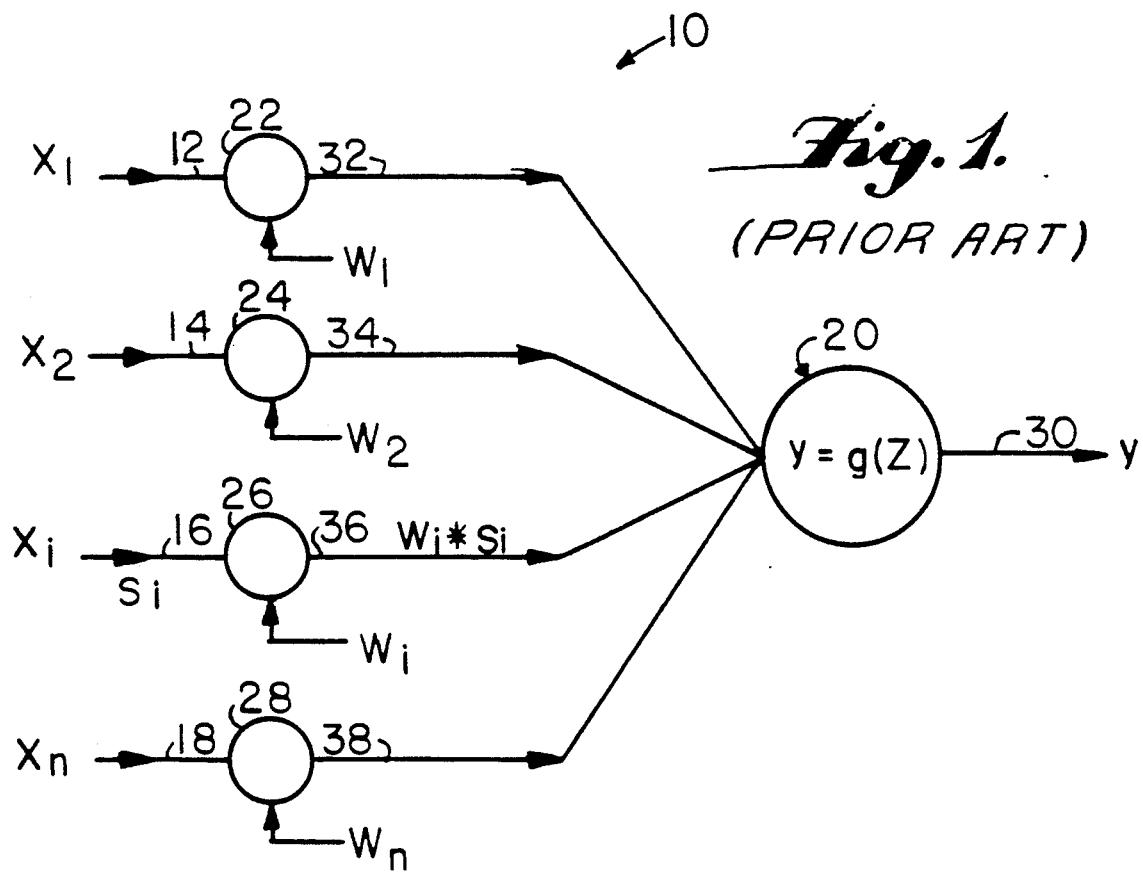
FIG. 1 is a schematic diagram illustrating a single neuron-function circuit including synapses in accordance with the prior art.

FIG. 1 illustrates, in schematic form, a single neuron circuit 10 of the prior art defined by a nonlinear function circuit 20, n synapses 22, 24, 26, and 28 having n respective input lines $X_1, X_2, \ldots X_i, \ldots X_n$ and a single output Y, indicated generally at 30. Each of the n synapses has a respective input connected to one of the neuron circuit input lines $X_i$, an output connected to the function circuit 20, and a weight factor $W_i$. For example, synapse 22 has an input 12 connected to input line $X_1$, an output 32 connected to the function circuit 20, and a weight factor $W_1$. For each synapse, such as the $i^{th}$ synapse, its input signal $S_i$ is multiplied by its weight factor $W_i$ to produce an output signal equal to $W_i*S_i$ on the output 30.

The non-linear function circuit 20 forms the output of neuron circuit 10. The output of each synapse 22, 24, 26, and 28 is connected to the function circuit 20 which forms the sum of the inputs from the synapses 22, 24, 26, and 28. The output Y of the neuron circuit 10 is a nonlinear function of this sum. Denoting this sum by Z, with $Z=(W_1*S_1+W_2*S_2\ldots+W_i*S_i\ldots+W_n*S_n)$, the output response $Y=g(Z)$ equals the nonlinear function g of the sum Z.

Figure 2:
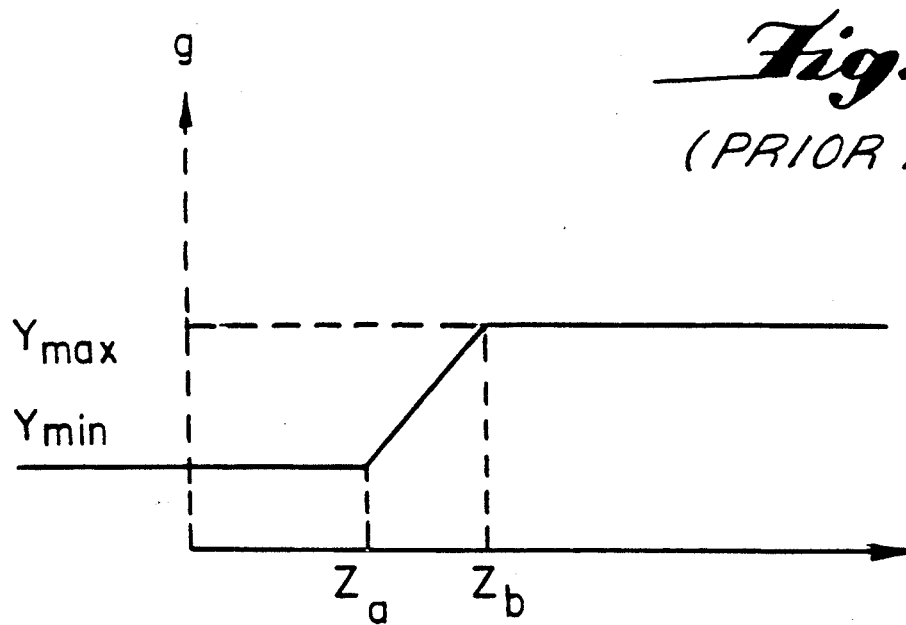
FIG. 2 is a diagram showing an example of the non-linear input-output relationship of a neuron circuit according to the prior art.

An example of such a nonlinear function g is illustrated in FIG. 2 and illustrates the function g(Z) divided into three domains where:

$$g(Z) = Y_{max} \quad \text{if } Z \geq Z_b$$
$$g(Z) = m*(Z - Z_a) + Y_{min} \quad \text{if } Z_a < Z < Z_b$$
$$g(Z) = Y_{min} \quad \text{if } Z \leq Z_a$$

In this example: $m=(Y_{max}-Y_{min})/(Z_a-Z_b)$, a positive constant; $Y_{max}=1.0$; $Y_{min}>0.0$; $Z_a=0.25$; and $Z_b=1.1$. Different embodiments of the nonlinear function may use different values and even different forms including squashing functions such as hard limiters or continuous sigmoid curves as discussed in R. P. Lippmann, "An Introduction to Computing with Neural Nets," IEEE Magazine, Pg. 5, April 1987.

A neural network is constructed of a plurality of interconnected neuron circuits with various types of such interconnections known in the art. The neural network operates by receiving one or more input signals and transforming these input signals into one or more output signals through the interconnected neuron-function circuits. The weights of the various synapses control the response of each neuron circuit and hence the overall response of the neural network. Typically, the various weights are adjusted during a learning process to provide the desired network response. In the prior art, this learning process involves the application of various exemplary inputs for comparison of the actual outputs with the desired outputs. As pointed out above, this feedback process may not converge quickly and equilibrate at the weights required for the desired network response. In addition, this technique requires the use of global parameters, namely, the network outputs, for the adjustment of each individual synapse.

Figure 3:
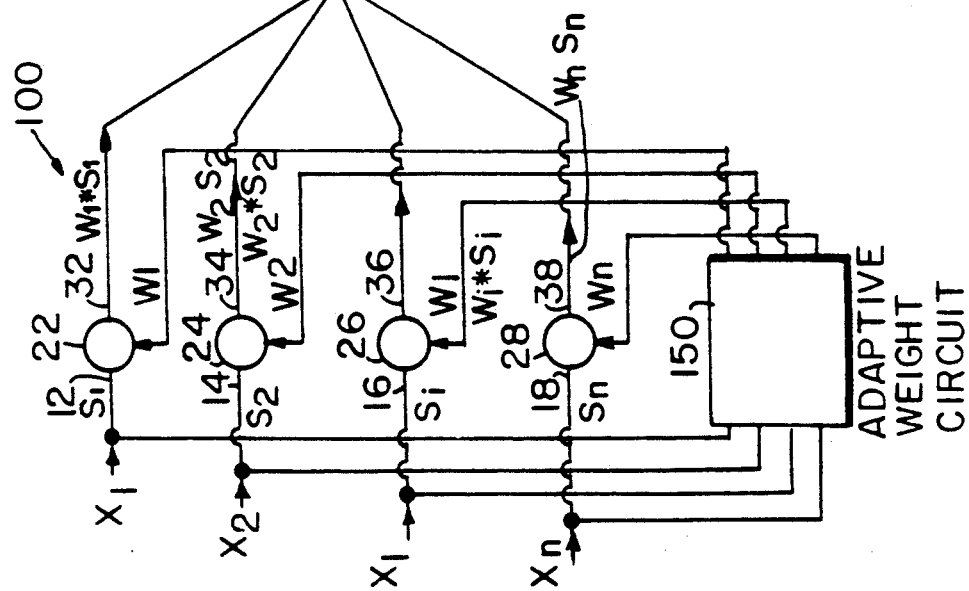
FIG. 3 is a schematic diagram illustrating a single neuron circuit including synapses suitable for learning correlations in accordance the present invention.

FIG. 3 illustrates a neuron circuit 100 in accordance with one embodiment of the present invention. The neuron circuit 100 includes input lines $X_1, X_2, \ldots, X_i, \ldots X_n$; synapses 22, 24, 26, and 28; function circuit 20; and output line 30 in the same manner as illustrated in FIG. 1, and an adaptive weight circuit 150. The adaptive weight circuit 150 receives signals from each of the input lines $X_1, X_2, \ldots, X_i, \ldots, X_n$ and includes outputs connected to the synapses 22, 24, 26, and 28 for adjustment of the respective weights $W_1, W_2, \ldots, W_i, \ldots, W_n$. The adjustment of each weight depends upon the current or present input to that synapse, the prior history of inputs to that synapse, and the current and prior inputs to at least one other synapse of the same neuron circuit.

The preferred synaptic-weight training rule for the adaptive weight circuit 150 for modifying the synaptic weights is as follows: The adaptive weight circuit 150 considers each synaptic weight once each time period, i.e., a predetermined sensing or operating time period. The weight $W_n$ of a particular synapse may be either increased, retained at the same level, or decreased. The weight of a particular synapse is increased if, and only if, that synapse received a nonzero input during both the current time period and the immediately prior or preceding time periods and each synapse of a predetermined set of at least one synapse of the same neuron circuit also received a nonzero input during both the current and immediately prior time periods. The weight of a particular synapse is retained at the same level if, and only if, that synapse received a nonzero input during the current and immediately prior time periods and not all synapses of the predetermined set of synapses received a nonzero input during both the current and immediately prior time periods. Otherwise the weight of that synapse is reduced. By nonzero input, the above synaptic-training rule refers to a signal greater than the minimum output signal $Y_{min}$ with $Y_{min}=$zero in the preferred embodiment. The synaptic-weight training rule is shown in flow diagram form in FIG. 3A.

When a weight W is modified, the rate of change is proportional to the difference between the current value W and the extreme allowed value in the direction of change. These extremes may be, for example, 0 or 1 for an excitatory synapse and $-0.5$ or 0 for an inhibitory synapse. The constants of proportionality for increasing and decreasing the values of collateral synapse weights are a and b, respectively. Thus, if a weight W is to be increased, the new value W' is given by:

$$W' = W + a*|W_{max} - W|$$

If the weight W is to be decreased, then the new value W' is given by:

$$W' = W - b*|W - W_{min}|$$

where, for example: $a=0.33$; $b=0.005$; $W_{max}=1.0$; and $W_{min}=0.0$ for excitatory synapses; and $W_{max}=-0.5$ and $W_{min}=0.0$ for inhibitory synapses.

Figure 4:
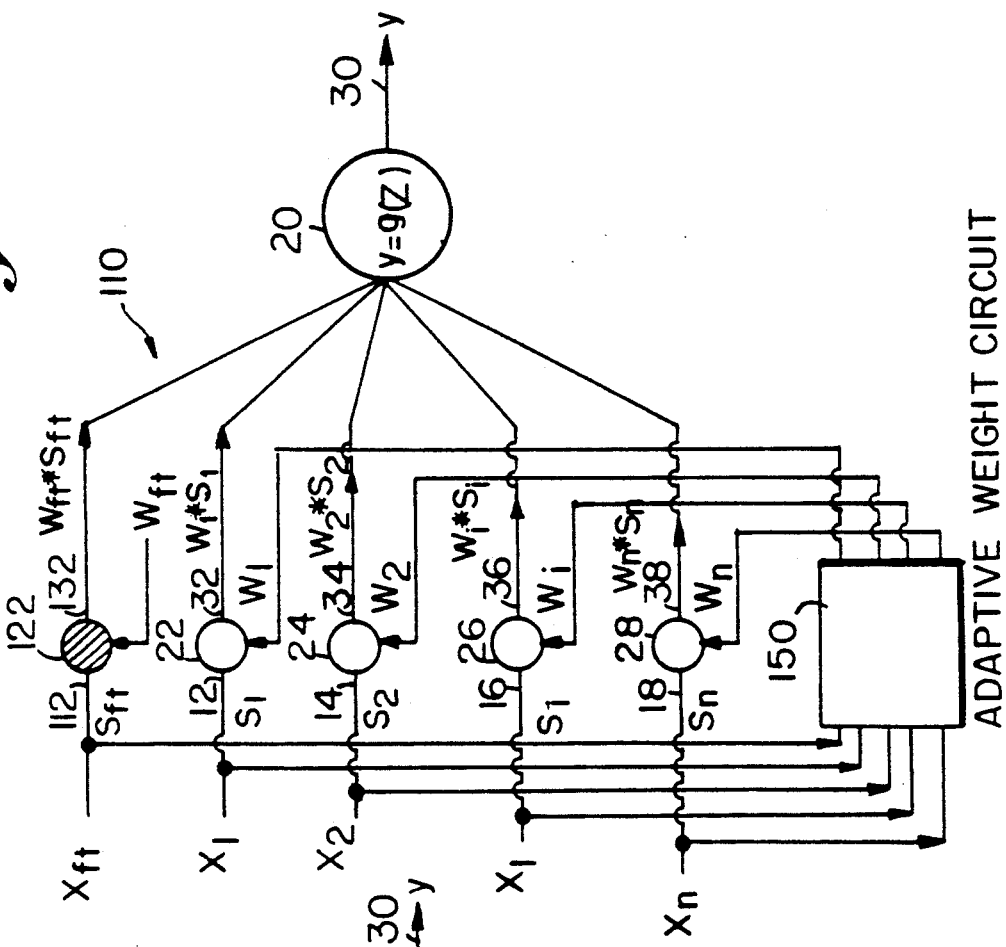
FIG. 4 is a schematic diagram illustrating a single neuron circuit including synapses for learning both correlations and anti-correlations in accordance the present invention.

FIG. 4 illustrates a neuron circuit 110 in accordance with another embodiment of the present invention utilizing two types of connections: fixed weight flow-through connections, which serve to define a set of principal pathways and adjustable weight collateral connections. These two types of connections differ in that the weights (synaptic strengths) of the principal flow-through connections are always set at a constant high value and the collateral connections are initially set at a low value and are modified according to the above-mentioned synaptic training or learning rule. The neuron circuit 110 of FIG. 4 is similar to the neuron circuit 100 of FIG. 3 with the addition of a flow-through synapse 122 (having a cross-hatched pattern). The flow-through synapse 122 has an input 112 connected to receive the input on line $X_{fi}$, an output 132, and a predetermined fixed weight $W_{fi}$. The adaptive weight circuit 150 is connected to input line $X_{fi}$ to receive the input signal $S_{fi}$ to the flow-through synapse 122 so that the presence or absence of a signal $S_{fi}$ on the input line $X_{fi}$ may influence the adjustment of the respective weights $W_1, W_2, \ldots, W_i, \ldots, W_n$, if the signal $S_{fi}$ on input line $X_{fi}$ is selected as being within the inputs influencing the weight of a particular synapse. In the context of the learning rule, the signal $S_{fi}$ on input line $X_{fi}$ is no different than the signal on any other input line within the selected set for a particular synapse. The adaptive weight circuit 150 is not connected to flow-through synapse 122 to change its weight $W_{fi}$, and the weight $W_{fi}$ remains a predetermined constant which may be, for example, 0.91.

Figure 4A:
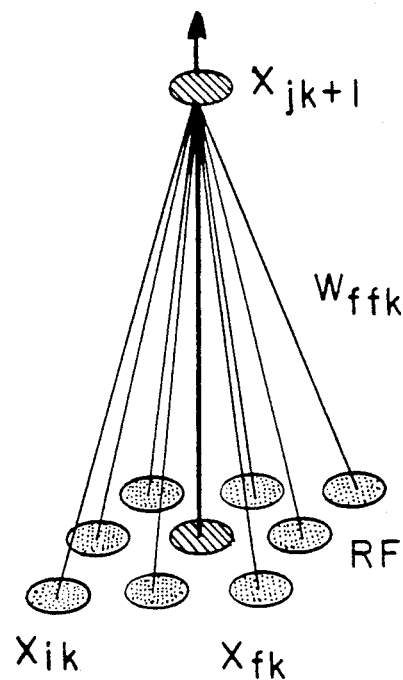
FIG. 4A is a conceptual illustration of a receptive field of a $k^{th}$ layer inputting to a flow-through synapse of a $k+1$ layer in which each flow-through synapse is shown in perspective as a solidly filled ellipse and each non-flow-through synapse is shown in shaded ellipse.
Figure 4B:
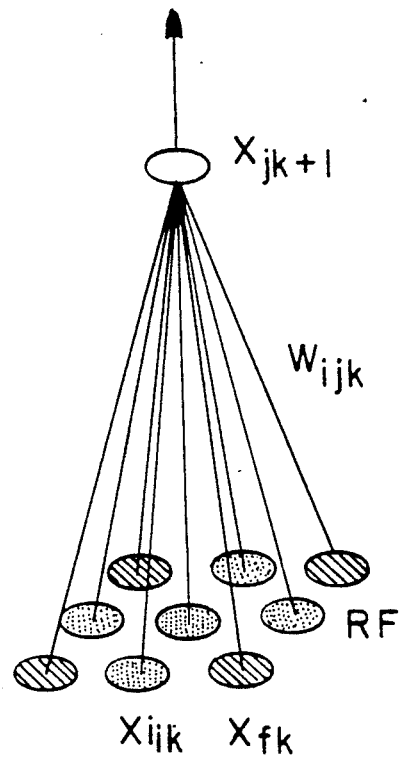
FIG. 4B is a conceptual illustration of a receptive field of a $k^{th}$ layer inputing to a non-flow-through collateral synapse of a $K+1$ layer in which each flow-through synapse is shown in perspective as a solidly filled ellipse and each non-flow-through adaptable synapse is shown in shaded ellipse.

As illustrated in FIG. 4A, a receptive field RF utilizing a flow-through input in which each flow-through synapse is shown in perspective as a solidly filled ellipse and each non-flow-through input, i.e., a 'collateral' connection, is shown as a shaded ellipse. In FIG. 4A, the principal flow-through pathway is shown as a thicker, darker pathway $W_{ffk}$ while the collateral pathways are shown in lighter lines. As shown, the flow-through pathway $W_{ffk}$ extends directly from one flow-through neuronal element in the $k^{th}$ layer to the next flow-through neuronal element in the $k+1$ layer while the collateral connections in the $k^{th}$ layer of exemplary illustration extend from the adjustable-weight neuronal element to the flow-through neuronal element. In contrast, FIG. 4B illustrates a combination of flow-through and collateral neuronal elements of a receptive field in the $k^{th}$ layer providing collateral connections only to an ajustable collateral neuronal element in the $K+1$ layuer; for the receptive field of the element with collateral connections only, any number of connections from neurons with flow-through connections may exist. Thus, a neuron with a flow-through connection receives connections from input (receptive) fields of arbitrary size (either all positive, or center-on/surround-off) but only a single connection from a neuron with a flow-through connection. A neuron with only collateral connections also has an arbitrary size receptive field but may include many neurons with flow-through connections. Conceptually, the flow-through connections are analogues of pathways for unconditioned stimuli (UCS), and the collateral connections are analogues of pathways for conditioned stimuli (CS) since the weights for the synapses of the collateral connections can be varied in accordance with the learning rule explained above.

Figure 4C:
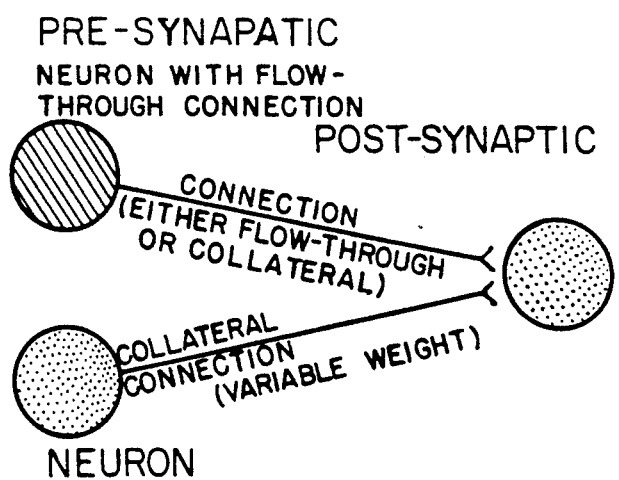
FIG. 4C illustrates the learning rule for neural combinations of flow-through and collateral connections for permitting weight increases.

The learning rule for a single architectural unit is also illustrated in graphical form in FIG. 4C. As shown, the architectural unit includes a neuron with a fixed-weight flow-through connection (FIG. 4) connected to a post-synaptic neuron through either a flow-through or a collateral connection and a neuron connected to the post-synaptic neuron through a collateral connection. At the synapse, the collateral connection knows the temporal relationships of the other connections synapsing on the same neuron in accordance with the learning rule, but has no information about any other connections or neurons, including the neuron upon which it synapses. As such, the learning rule is independent of and does not depend on the firing history of the post-synaptic neuron. The connection weights of the collaterals are modified by the following rule (as illustrated on the left in FIG. 4C): the weight of a collateral connection to a post-synaptic neuron is increased if, and only if, the collateral and the connections to that same post-synaptic neuron from neurons with a flow-through connection have both carried a signal two consecutive times (time=$t-\Delta t$ and time=$t$). The weight is not changed if the collateral connection has carried a signal twice successively and the connections to the same post-synaptic neuron from neurons with flow-through connections have not. Under all other combinations of circumstances, the weight associated with the collateral connection is decreased (i.e., the collateral neuron has not carried a signal twice successively). The rate of weight change is proportional to the difference between the current value of the weight and the extreme allowed values (usually 1 and 0) in the direction of the change, as described above.

FIGS. 5 to 8 illustrate an example of a neural network constructed of neuron circuits according to the present invention as illustrated in FIGS. 3 and 4. The neuron circuit 100 as illustrated in FIG. 3 is referred to hereinafter as a collateral neuron circuit, and the neuron circuit 110 as illustrated in FIG. 4 is referred to hereinafter as a flow-through neuron circuit. For simplicity, in the illustration of the neural network of FIGS. 5 to 8, each neuron circuit will be depicted as a circle; collateral neuron circuits 100 will be illustrated as shaded circles and flow-through neuron circuits 110 will be illustrated as filled circles. The associated connections between neuron circuits will be represented by lines terminated with arrows showing the direction of signal flow.

Figure 5:
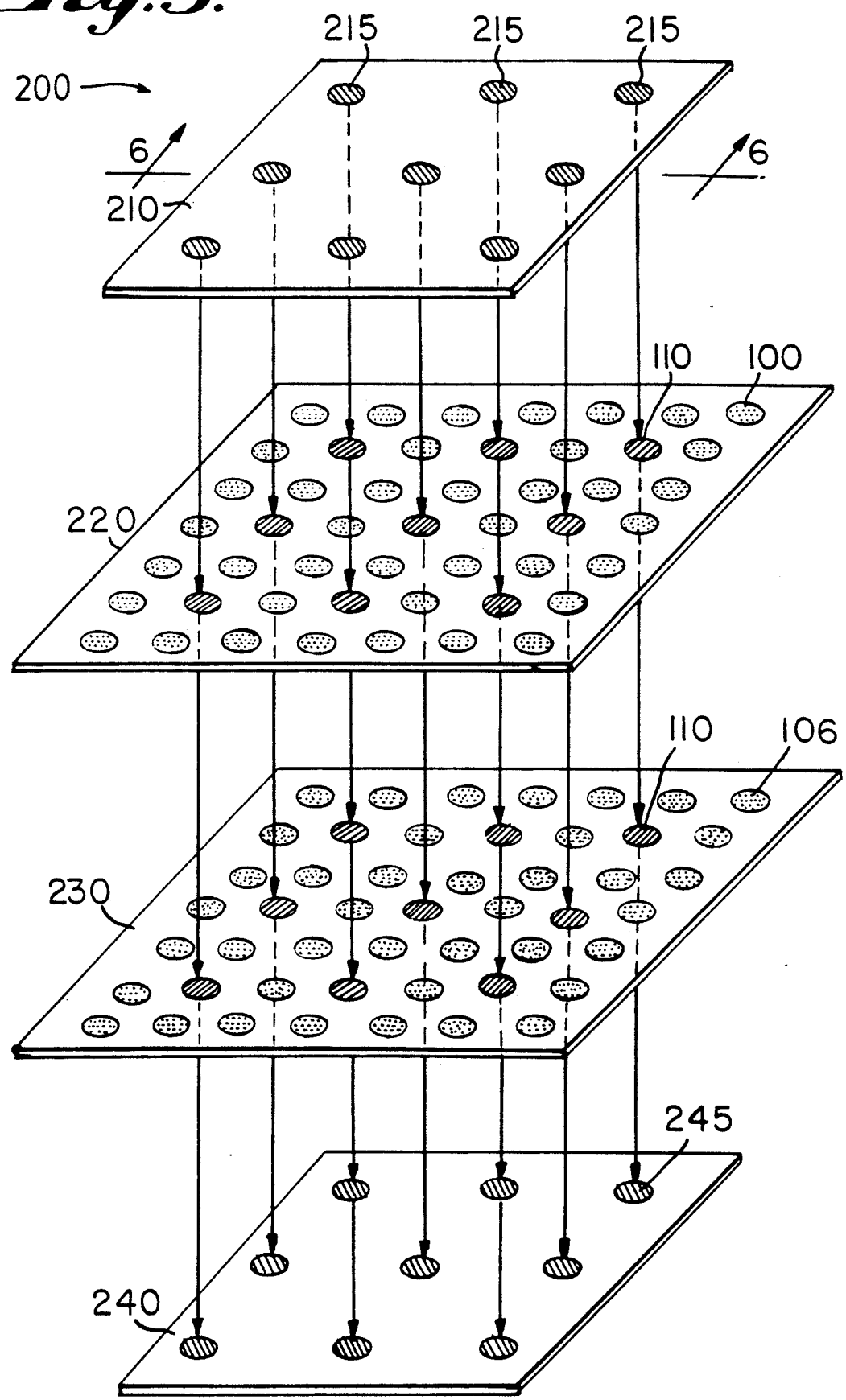
FIG. 5 is a partial schematic diagram of the architecture of a neural network according to the present invention including input and output arrays and two layers of flow-through and collateral synapses.
Figure 6:
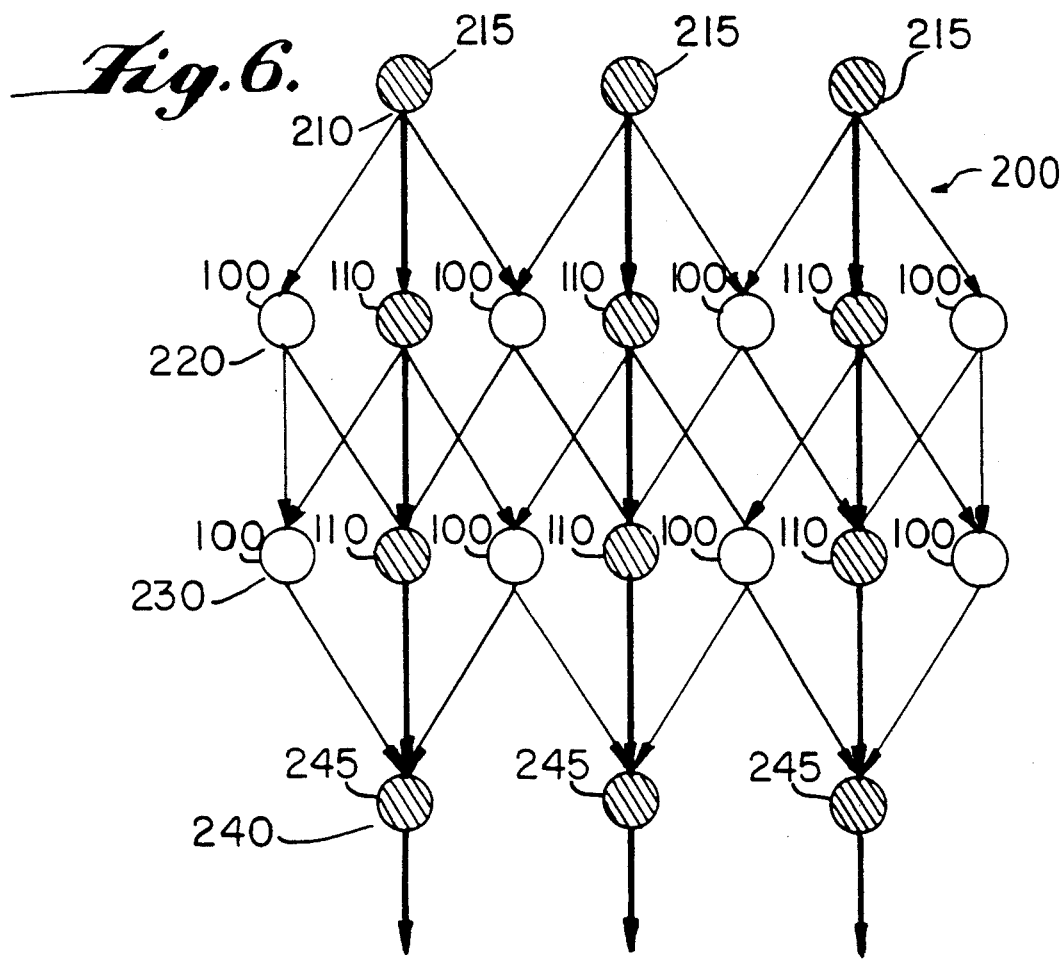
FIG. 6 is a sectional view taken along lines 6—6 of FIG. 5 with collateral synapses shown as open circles to illustrate the flow-through and collateral synapses and connection between the layers of neuron circuits.
Figure 7:
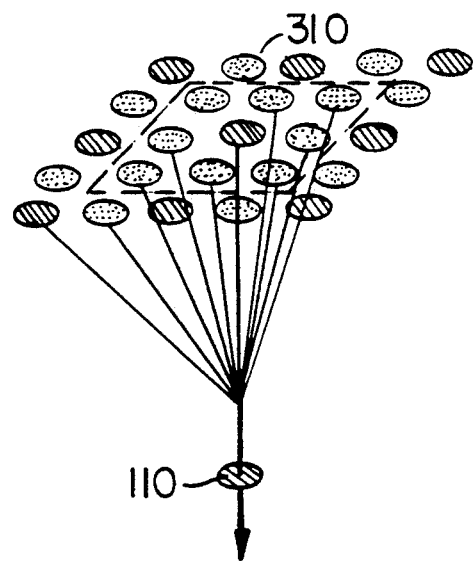
FIG. 7 illustrates the receptive field of a neuron circuits with a flow-through synapse connection.
Figure 8:
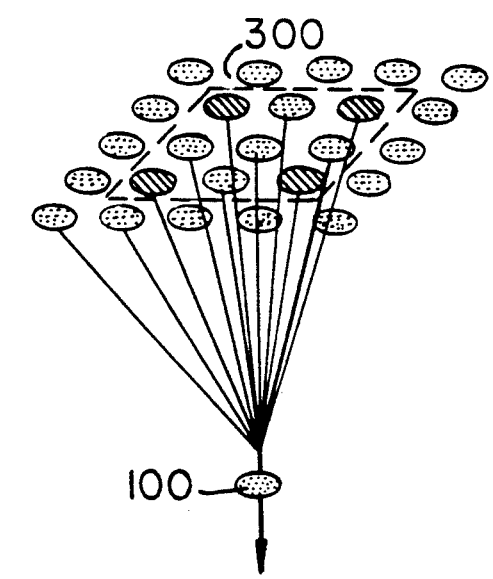
FIG. 8 illustrates the receptive field of a neuron circuits without a flow-through synapse connection.

The neural network of FIGS. 5 to 8 includes: a $3 \times 3$ array 210 of inputs; two $7 \times 7$ arrays of neuron circuits indicated at 220 and 230, each array including both collateral neurons 100 and flow-through neurons 110; and one $3 \times 3$ array 240 of outputs. A simplified view of the overall structure of this example is illustrated in cross-section in FIG. 6 which shows the collateral and flow-through synapse connections between neuron circuits for the cross section marked 6—6 in FIG. 5. FIGS. 7 and 8 further illustrate the synapse connections of the collateral and flow-through neuron circuits, respectively.

As shown in the partial perspective of FIG. 5, the architecture of the neural network, generally designated at 200, includes the array 210 of 3 rows and 3 columns of individual primary inputs 215. The input to neural network 200 is applied via this set of primary inputs 215. Output signals from the neural network are produced by the output array 240 which includes 3 rows and 3 columns of individual primary outputs 245. Two arrays 220 and 230 of neuron circuits 100 and 110 are interposed between the input array 210 and the output array 240. The arrays 220 and 230 each include 7 rows and 7 columns of neuron circuits. Each array 220 and 230 contains: nine flow-through neuron circuits 110, shown as solid circles; and 40 collateral neuron circuits 100, as represented by the shaded circles. The flow-through neuron circuits 110 are disposed in a $3 \times 3$ array that is embedded within the $7 \times 7$ combined array.

Flow-through neuron circuits 110 are connected via flow-through synapses (FIG. 5) to form continuous signal paths directly linking each input 215 to a corresponding output 245. Thus each flow-through neuron circuit 110 of array 220 has an input connected via a flow-through synapse to a corresponding input 215 of input array 210. In addition, each flow-through neuron circuit 110 of the second array 230 is connected via a flow-through synapse to a corresponding neuron circuit 110 of array 220. Lastly, the outputs of the flow-through neuron circuits 110 of the array 230 are connected to a corresponding output 245 of output array 240. Thus separate paths, including flow-through synapses and flow-through neuron circuits, links each input 215 to a corresponding output 245. For clarity, only connections via flow-through synapse arrays 210, 220, 230, and 240 are shown in FIG. 5, with all collateral connections omitted.

A cross-sectional view of the neural network 200 taken along line 6—6 of FIG. 5 is shown in FIG. 6. The connections between neuron circuits via the flow-through synapses are denoted by relatively thick lines as also illustrated in FIG. 5. The remaining connections within the neural network 200 are via ajustable-weight collateral synapses and are represented by the relatively thinner lines. Collateral synapses connect primary inputs 215 to input lines of collateral neuron circuits 100 in the first array 210. Collateral synapses connect the output lines of both collateral neuron circuits 100 and flow-through neuron circuits 110 in the first array 220 to single input lines of both collateral neuron circuits 100 and flow-through neuron circuits 110 in the second array 230, respectively.

The typical receptive field of a flow-through neuron circuit 110 is illustrated in FIG. 7. The receptive fields consist of a 3×3 array 310 of neuron circuits located in a previous array (within the dashed squares). A single connection via a flow-through synapse is provided from the output of a flow-through neuron circuit 110 of the prior layer; all other links are via collateral synapses. All collateral synapses linking the neuron circuits in the receptive field are excitatory, i.e., their weights have positive values preferably within the range from 0.0 to 1.0. As indicated above, the flow-through synapse has a predetermined fixed weight near the maximum allowable weight, i.e., 0.91.

The typical receptive field of a collateral neuron circuit 100 is illustrated in FIG. 8. The receptive fields consist of a 3×3 array 300 of neuron circuits located in a previous array (within the dashed square) with all connections made via collateral synapses. All these collateral synapses are excitatory, i.e., their weights have positive values preferably within the range from 0.0 to 1.0 with the set point for the weight determined during training.

In the embodiment of FIGS. 5-8, both the flow-through neuron circuits 110 and the collateral neuron circuits 100 within the second array 230 (FIGS. 5 and 6) each have receptive fields containing sixteen additional neuron circuits disposed adjacent to the outside border of the dashed squares as shown in FIGS. 7 and 8; these additional connections are via inhibitory collateral synapses. FIGS. 7 and 8 each illustrate only two such connections for reasons of clarity. The weights of the inhibitory collateral synapses are negative and range in value from 0.0 to a "maximum weight" of preferably −0.5. In the preferred embodiment of the present invention, the extra connections via inhibitory synapses have been found to increase the training efficiency of the neural network 200, but in this and other embodiments having larger arrays of neuron circuits, there is no requirement that extra connections via inhibitory synapses be included.

The typical use of a neural network of the type disclosed is for recognizing whether a pattern belongs to a class of patterns having common characteristics. The first step in training initializes the weights of all the collateral synapses to values near their minimum. In the preferred embodiment, excitatory collateral synapses are given initial values of 0.10, while the inhibitory collateral synapses are given initial values of −0.10. All the flow-through synapses have fixed weights near the maximum weight, for example, 0.91. This value is set so that the inputs will not propagate to the outputs without additional stimulation from the to-be-trained collateral neuron circuits, that is, neuron circuits not on the flow-through path. Once initialization is completed, the neural network 200 is ready for training.

Training takes place by successively applying to the primary inputs 215 sets of signals derived from patterns having one or more common characteristics. These sets of signals can be groups of either analog or binary values derived from patterns belonging to a class having the common characteristics. Examples include sets of binary values representing the black and white pixel levels from pictures of the same object taken at slightly different angles or corrupted by noise, and sets of analog values sampled from voice waveforms obtained from different persons speaking the same word or group of words. For each application of a signal set to the primary inputs 215, the weight of each collateral synapse is modified by the adjustable weight circuit 150 for the neuron circuit in accordance with the learning rule described above. This successive application of the signal sets takes place for a sufficiently long period of time for the collateral synapse weighs to converge towards and achieve relatively stable values. These relatively stable values will be dynamically stable, i.e., changing within the presentation of the set of input signals without any net change over the whole of the set.

Figure 9:
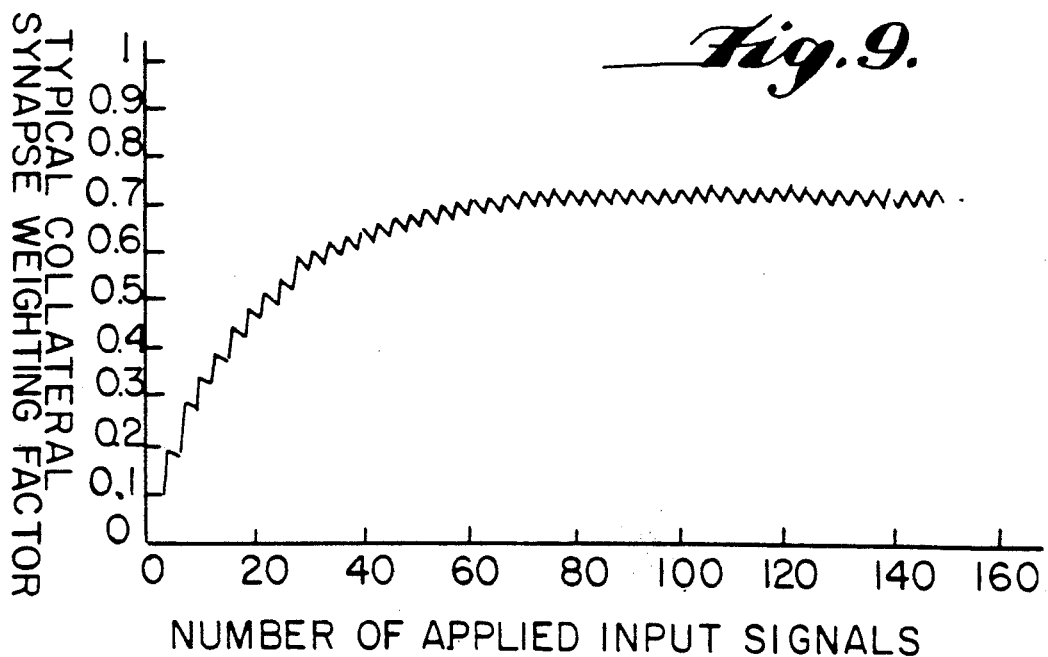
FIG. 9 is a plot illustrating the convergence of the weight of a typical collateral synapse during training of the embodiment of FIGS. 1-8.

A plot of the value of a weight for a typical excitatory collateral synapse as a function of the number of successive signal sets presented to the primary inputs is shown in FIG. 9. The plot was obtained from a computer simulation of a neural network representing the example described above in relationship to FIGS. 5-6. The set of signals sequentially presented to the primary inputs consisted of three input sets. The first two sets were identical and were derived from an image having 3×3 pixels, each pixel having a value ranging from 0.0 to 1.0, while the third set was a null set containing 3×3 pixels, all having values of 0.0. When these three input signal sets were continuously and sequentially presented to the primary inputs, the weight of a typical collateral synapse in the neural network converged monotonically towards and reached dynamic equilibrium in which weight increases and weight decreases over the set of patterns were equal with no net weight. When the weights of all collateral synapses in the neural network reach this dynamically stable equilibrium state, the neural network is said to be trained to recognize the patterns represented by the set of input signals successively presented to the primary inputs. At equilibrium, the weights fluctuate between limits that are determined by three system parameters: (1) the maximum allowed weight ($W_{max}$), (2) the learning increment, a, and (3) the weight decrement, b, together with the specific images and their order of presentation, i.e., their temporal association. The set of responses on the primary outputs 245 then represent the mean pattern of the collective group of patterns used in training.

Neural circuits operating in accordance with the organization and the training rule of the present invention provide several advantages over the prior art. First, the training rule is local to each neuron circuit, requiring no global error signal or measure for training. This results in improved learning performance of the neural network. If the neural network is embodied in a computer simulation, then the amount of computation required expands linearly with the number of synapses needed to connect the network. Computer simulations of neural networks employing learning rules in accordance with the prior art scale at a rate greater than linearly with the number of synapses. Similarly, for neural networks embodied in parallel hardware, the number of interconnections required for teaching the network increases linearly with the number of synapses. This greatly reduces the number of interconnections as compared to the prior art. Thus the present invention enables an increase in the size of the neural network with a lesser degree of additional effort. Because many problems require neural networks of hundreds or thousands of neuron circuits, this scaling factor can be a significant advantage in many applications.

The embodiments described above in the context of FIGS. 1-9 are effective in learning correlations; a further embodiment, referred to herein as the generalized embodiment, that learns both correlations and anti-correlations is presented in FIGS. 10-14.

The generalized version incorporates (1) the separation of the unconditioned stimuli and conditioned stimuli pathways into two separate input streams, (2) 'interneurons' that allows the system to learn anti-correlations as well as correlations among input signals, and (3) the implementation of dendritic "patches" that model the local interaction of unconditioned stimuli and conditioned stimuli pathways during associative learning. In order to implement these features, the pathway for the unconditioned stimuli pattern is separate and distinct from the pathway for the conditioned stimuli pattern, and, in order to induce associative learning, the unconditioned stimuli pattern is presented together with the conditioned stimuli pattern (each to their own input neurons). After the association has been learned (and in an exact parallel with Pavlovian conditioning), presentation of the conditioned stimuli input alone will elicit, as the output of the network, that unconditioned stimuli with which that conditioned stimuli has previously been associated. In order for the network to actively learn "anti-correlations", i.e., a signal in one of the separate pathways is associated with the lack of a signal in another pathway, every direct excitatory connection from an unconditioned stimuli input neuron to an output neuron is supplemented by a parallel "indirect" connection. To this end, the conditioned stimuli input neuron is indirectly connected to the output neuron via an inhibitory connection to an interneuronal element with spontaneous activity which, in turn, has an excitatory connection to the output neuron.

Figure 10:
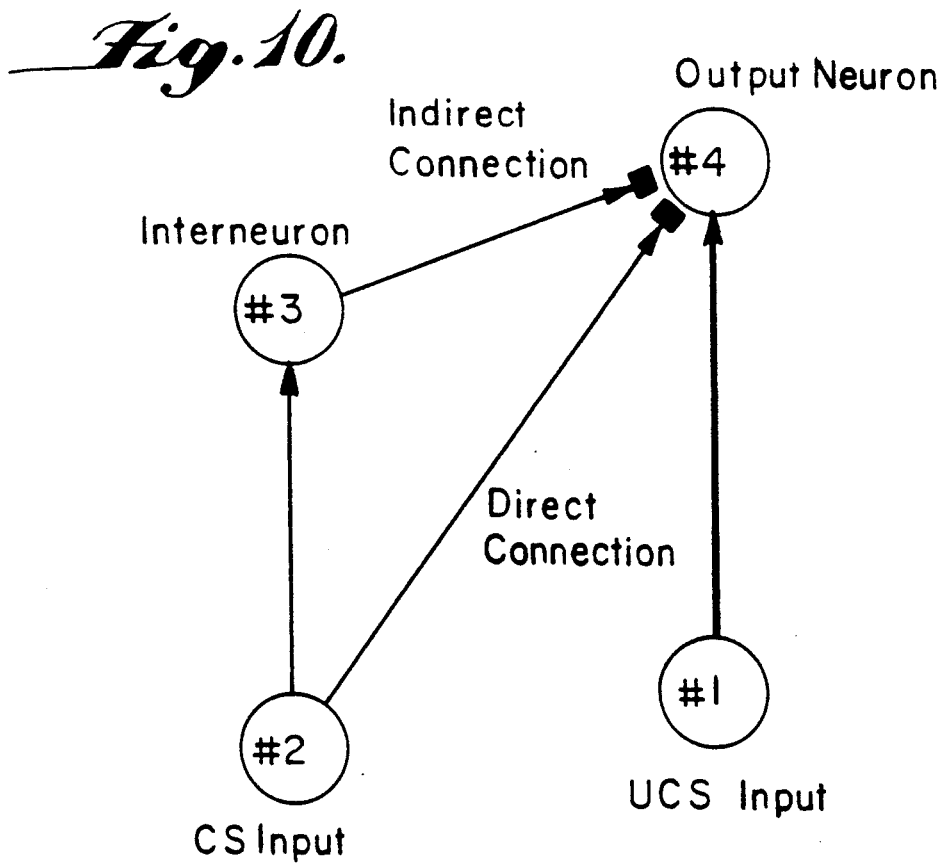
FIG. 10 is an illustration of the basic architectural unit of a generalized version of the network FIGS. 1-9 for learning both correlations and anti-correlations and including interneurons and patches.

The basic architectural unit of the generalized network, consisting of the separate unconditioned stimuli and conditioned stimuli pathways along with the indirect connection, is illustrated in FIG. 10. As shown, the relatively thicker vertical connection from neuron 1 to the output neuron 4 represents a fixed-weigh flow-through connection from the unconditioned stimuli input (neuron 1); the relatively thinner lines represent collateral connections from the conditioned stimuli input (neuron 2); neuronal elements 3 and 4 have spontaneous firing activity. The arrow-tipped lines represent excitatory connections, the circle-terminated lines represent inhibitory connections, and the squares represent 'patches' whose sign is determined during training by the signal in the flow-through (unconditioned stimuli) connection from the unconditioned stimuli input. This apparent ambiguity of sign is a computationally effective method of restricting attention to active patches, as described below, and does not imply or represent a change in function of an existing synapse.

Figure 11:
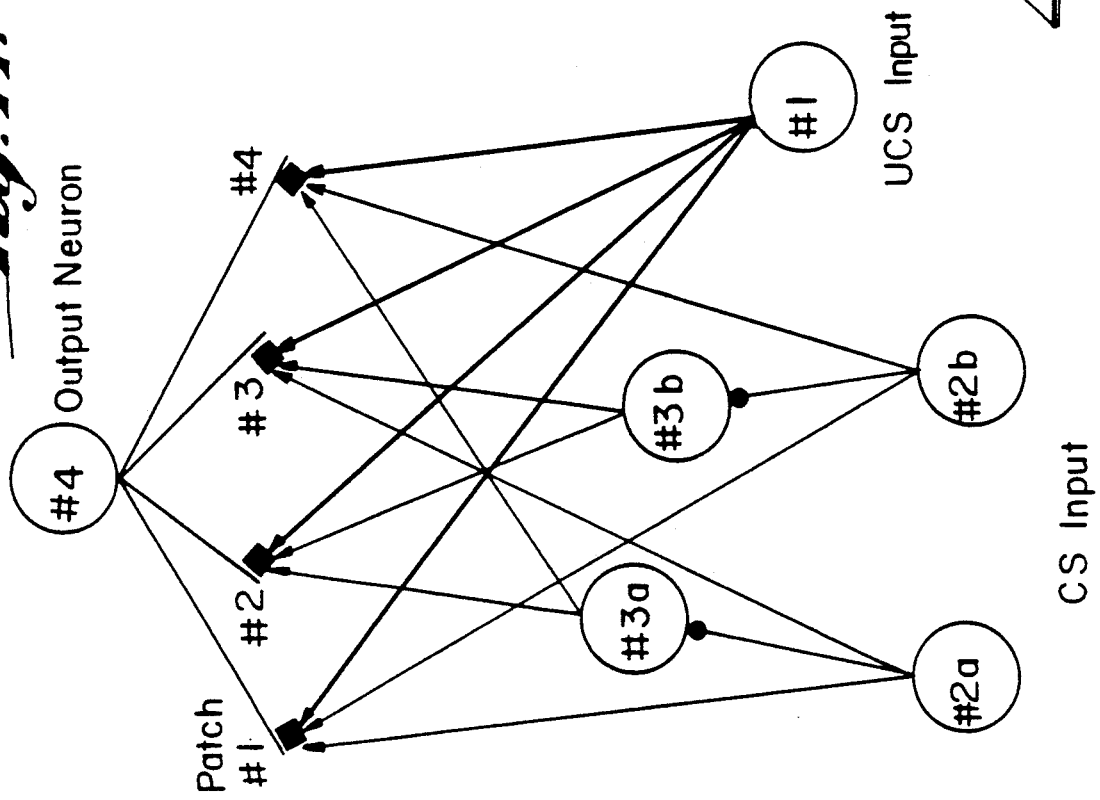
FIG. 11 illustrates a generalized network with two conditioned stimuli inputs.

To permit the network to learn the patterns of its input signals, rather than learning the signals from each individual input, "patches" on the "dendritic membrane" have been introduced with each patch reflecting a pattern of activity on the input neurons; weights are associated with each patch rather than with each connection and represent how well the neuron has learned the patch pattern. To illustrate the differences between the original network of FIGS. 1-9 and the generalized version of the network and present the concept of patches, FIG. 11 illustrates a generalized network with two conditioned stimuli inputs, neurons 2a and 2b. As shown, patch #1 receives a direct connection from neurons 2a and 2b and is active when both neurons 2a and 2b are ON. Patch #2 receives an indirect connection from neurons 2a and 2b and is active when both neurons 2a and 2b are OFF. Patch #3 receives a direct connection from neuron 2a and an indirect connection from neuron 2b and is active when neuron 2a is ON and neuron 2b is OFF. Lastly, patch #4 receives an indirect connection from neuron 2a and a direct connection from neuron 2b and is active when neuron 2a is OFF and neuron 2b is ON. A flow-through path is provided from the unconditioned stimulus input neuron to each of the patches #1, #2, #3, and #4 as indicated by the heavier weight arrow-tipped lines. The net result of the signals is to inhibit or excite the output neuron 4 depending on whether the unconditioned stimuli is ON or OFF when the patch is active.

Because a conditioned stimuli input inhibits the interneuron, the direct and indirect connection cannot simultaneously carry a signal. Accordingly, there are four possible patterns of input for the output neuron 4 to learn: (1) neurons 2a and 2b both ON (patch #1 active), (2) neurons 2a and 2b both OFF (patch #2 active), (3) neuron 2a ON and neuron 2b OFF (patch #3 active), and (4) neuron 2a OFF and neuron 2b ON (patch #4 active). Each of the four patterns may be associated with either a signal from the unconditioned stimuli or no signal from the unconditioned stimuli for a total of eight different combinations. By allowing the sign of the patch weight to change depending on whether the unconditioned stimuli is ON or OFF, as explained below, only four patch patterns need to be stored explicitly to reproduce the eight combinations. The patches associated with a signal from the unconditioned stimuli produce an excitatory input, whereas the patches associated with no signal from the unconditioned stimuli are inhibitory.

The introduction of patches permits recognition, and therefore separation, of the patterns of incoming signals, i.e., recognition of which of the above described independent combinations is being activated. These independent patterns have been termed herein as a "patch" as an analogy to the synaptic patches believed to be formed on branches of the dendritic tree of vertebrate neurons. Consequently, the weight associated with learning is now assigned to the patch as a whole, rather than to each incoming connection. By explicitly defining patches, the input signal is compared to all possible patch patterns, and the patch whose stored pattern is most similar to the input signal carries the signal.

The following method is used for determining the patch that carries the signal where each patch i is described by a binary-valued vector $P_i(n)$, where n is the index on the neurons that provide input to the patch, and $P_i(n) = 1$ if the signal came from the direct connection, and $P_i(n) = -1$ if the signal came from the indirect connection.

The input signal is represented by the continuous-valued vector x(n) where n is the index on the neurons providing input to the patch and x(n) may be any value between 0 and 1. If x(n) is small, then the spontaneously active interneuron is not inhibited and the signal on the indirect connection is large. The signal on the indirect connection is represented as S(x(n)) or s(n). If SF is the level of spontaneous firing activity and g(Z) is as defined above, then $$s(n) = g(SF - x(n)).$$

To calculate the degree of mismatch, a binary representation, D(n), of the input signal must be calculated:

D(n) = 1 if x(n) > s(n) (the direct connection carries the signal), and

D(n) = −1 if x(n) < s(n) (the indirect connection carries the signal).

The degree of mismatch for a patch i is calculated as the Hamming distance between D(n) and $P_i(n)$ and the most similar patch i, and thus the patch that carries the signal is that patch with the smallest degree of mismatch, i.e., the patch with the greater computational similarity. In the event of a tie, the sum of $(x(n) - s(n))^2$, for those n for which $D(n) \neq P(n)$, is calculated and the patch with the smallest value is selected as the most similar.

An alternative method of determining the most similar patch is to calculate a value termed herein as the degree of match, DM, as follows:

$$DM_i = \sum_n [P_i(n)*(x(n) - s(n))]$$

The degree of match is a function of the absolute difference between s(n) and x(n). For each n, if $D(n) = P_i(n)$ then the absolute difference between s(n) and x(n) is added to the total, if $D(n) \neq P_i(n)$ then the absolute difference is subtracted from the total.

The learning rule that governs the patches is analogous to that described above: the weight on the patch that carries a signal is increased in absolute value:

$$W_p(t) = W_p(t - \delta t) + a*[W_{max} - W_p(t - \delta t)]$$

weights on all other patches are decreased in absolute value:

$$W_p(t) = W_p(t - \delta t) - b*W_p(t - \delta t)$$

As described above, $W_{max}$ is the maximum allowed weight on a patch, 'a' is the learning increment, and 'b' is the learning decrement.

For this implementation a slight modification to the learning rule is needed: if the flow-through connection carries a signal, the weight is increased in a positive direction on the patch which carries the signal and, if the flow-through connection does not carry a signal, increase the magnitude of the negative weight:

$$W_p(t) = W + a*[W_{min} - W_p(t - \delta t)]$$

where $W_{min}$ is the minimum allowed weight on a patch (usually $W_{min} = -W_{max}$).

If the same two conditioned stimuli patterns are presented, one with the unconditioned stimuli ON and the other with the unconditioned stimuli OFF, stimulation of the network with conditioned stimuli only is ambiguous with respect to the unconditioned stimuli that is to be reproduced. This situation will be reflected in the fact that the patch weights will be near zero, since training with opposite unconditioned stimuli's results in about the same number of increases and decreases in the patch weight. If, on the average, one set of associated patterns (CS and UCS) is presented more frequently than the other, the patch weight will be biased in the direction of reproducing the more frequently presented association.

A further computational simplification is introduced by not storing all possible 2N patches (where N is the upper limit of n, the number of neurons providing input to the patch); instead, only patches that are needed (whose number is a function of the specific unconditioned stimuli and conditioned stimuli inputs) are stored by the network. When a new signal is presented on the input, the pattern of activation is compared to existing patches. If the new signal is similar to an existing patch (the degree of mismatch is smaller than the "patch creation threshold"), then the signal is carried by that patch and its weight is changed according to the learning rule. If the new signal is not similar to an existing patch, a new patch is stored. Repeated presentations of the same (or a similar pattern) causes the weight associated with the patch to increase. Patches which carry signals frequently have high weights, whereas weights are low on patches which carry signals rarely. An additional far-reaching consequence of the introduction of patches is that, without any additional complications, it eliminates both of the problems associated with memory capacity that plagues other artificial neural networks. It permits the storage of very large number of patterns, and these patterns need not be orthogonal.

The network of FIG. 11 can be expanded to learn to associate images, since the number of conditioned stimuli inputs is independent of the number of unconditioned stimuli inputs, allowing the network to associate a large image with a much smaller representation or vice versa. Additionally, the network can be trained as an auto-associator, by presenting the same pattern to both the unconditioned stimuli and conditioned stimuli pathways, or as a hetero-associator, by presenting different patterns to the unconditioned stimuli and conditioned stimuli pathways. In both auto- and hetero-association, both the conditioned stimuli and unconditioned stimuli inputs may be noisy. By configuring the unconditioned stimuli input appropriately, a network trained as a hetero-associator can be made to function as a pattern classifier (as in the case of exclusive-OR function).

Figure 12:
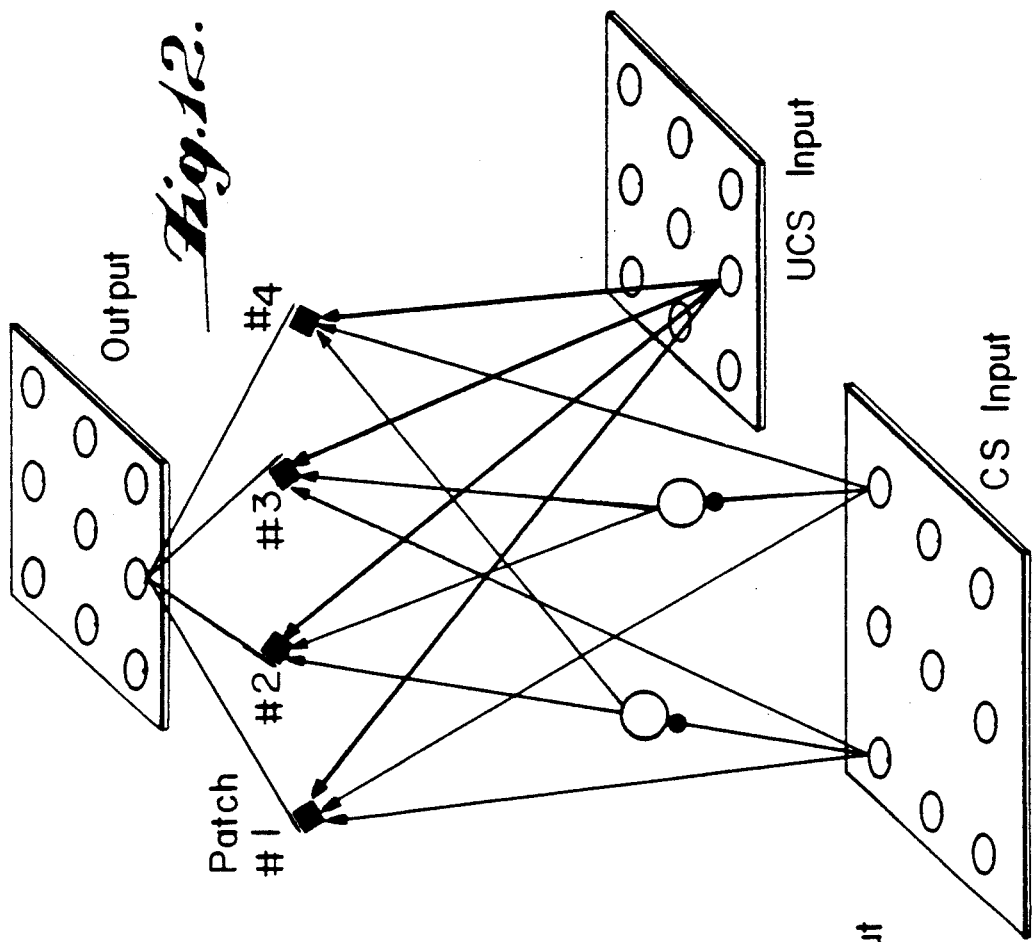
FIG. 12 is an illustration of a generalized network of FIG. 11 organized as a pattern completion network.

As shown in FIG. 12, the network is expanded to have nine conditioned stimuli input neurons in a 3×3 array ('CS input'), together with associated 3×3 arrays of interneurons, unconditioned stimuli, and output neurons. Each patch of each output neuron receives connections from each of the nine conditioned stimuli inputs and interneurons (fully connected) and one unconditioned stimuli input. At least three patches per output neuron are required, since the number of patches needed is at least the number of patterns to be learned. This follows from the consideration that, in general, the pattern of inputs from the receptive field to an output neuron will be different for each pattern to be learned, and each different pattern activates its own, different, patch.

Three experiments were conducted utilizing the 3×3 network and organization of FIG. 12 to demonstrate the network's ability to classify and restore patterns degraded by analog noise. The input and test patterns for all three experiments were noisy, 3×3 pixel images of the letters T, C, and a left-shifted C' in which the intensity value of the nine input pixels varied between zero and one with a higher probability of values close to one for pattern pixels.

In the first experiment, designed to demonstrate network's performance as a pattern restorer, the network was auto-associatively trained using a set of 30 noisy (SNR=3.0) training images derived from binary patterns: 10 T's, 10 conditioned stimuli, and 10 C's with image quality at signal-to-noise ratios (SNR) of 3.0 and 1.5. At each iteration, a pattern was chosen at random from the training set and the same pattern presented to both the conditioned stimuli and unconditioned stimuli pathway. The binary patterns are not presented to either the unconditioned stimuli or the conditioned stimuli pathways. The pattern was propagated through the network and weights were adjusted according to the learning rule described above. This process was repeated until the weights reach their equilibrium value, after about 120 presentations of each pattern type. The trained network was tested by presenting 3000 noisy patterns (1000 of each type) to the conditioned stimuli alone and evaluating the output of the network. Performance was measured as the average improvement (over the 3000 patterns) in appearance of the test patterns. The improvement was calculated as the difference between the Euclidian distance from the output pattern to the "ideal" (binary) pattern and the Euclidian distance from the input pattern to the "ideal" pattern. Overall, the trained network improved pattern appearance by 80 percent, using the comparison of input and output described above.

In the second experiment, the network's performance as a hetero-associator was evaluated by teaching the same network to associate T with X, C with U, and C' with +. The same set of 30 noisy (SNR=3.0) training images was used for hetero-associating as for auto-associating. However, to train the network to associate, for example, T with an X, a randomly chosen noisy T was presented to the conditioned stimuli while a binary X was presented to the unconditioned stimuli. After training, presentation of an exemplar of T alone to the conditioned stimuli elicited an X (the CR) at the output, etc.

The trained network was tested by presenting to the conditioned stimuli the same 3000 noisy patterns presented to the auto-associatively trained network and evaluating the output, which output showed excellent performance.

In the third experiment, the network's performance as a classifier to noisy T's, conditioned stimuli, and left ward displaced conditioned stimuli. To the network, classification is a form of hetero-association in which the number of unconditioned stimuli input pixels is equal to the number of pattern types the network was to learn. For classification of T, C, and C', each pattern type is associated with a classification vector (a three-pixel pattern in which only a single pixel is ON). The T classification vector=(1 0 0), the C classification vector=(0 1 0) and the C' classification vector=(0 0 1). The network was configured with a 3×3 array of input and interneurons, and a 1×3 array of unconditioned stimuli and output neurons.

To evaluate the effect of signal-to-noise ratio (SNR) of the training set on classification performance, the network was tested after training with five different training sets. One training set consisted of the binary images (an infinite SNR); the other training sets have signal-to-noise ratios of 5.0, 3.0, 2.0 and 1.5. The network was trained by presenting 120 examples of each type of pattern to the conditioned stimuli, randomly chosen from a particular set of 30 training images, along with the appropriate classification vector to the unconditioned stimuli. The classification performance of each network was measured by calculating the percent of correct classifications of (1) a set of 3000 patterns with SNR=3.0 (the same set as was used in the first two experiments) and (2) a set of 3000 patterns with SNR=1.5.

Figure 13:
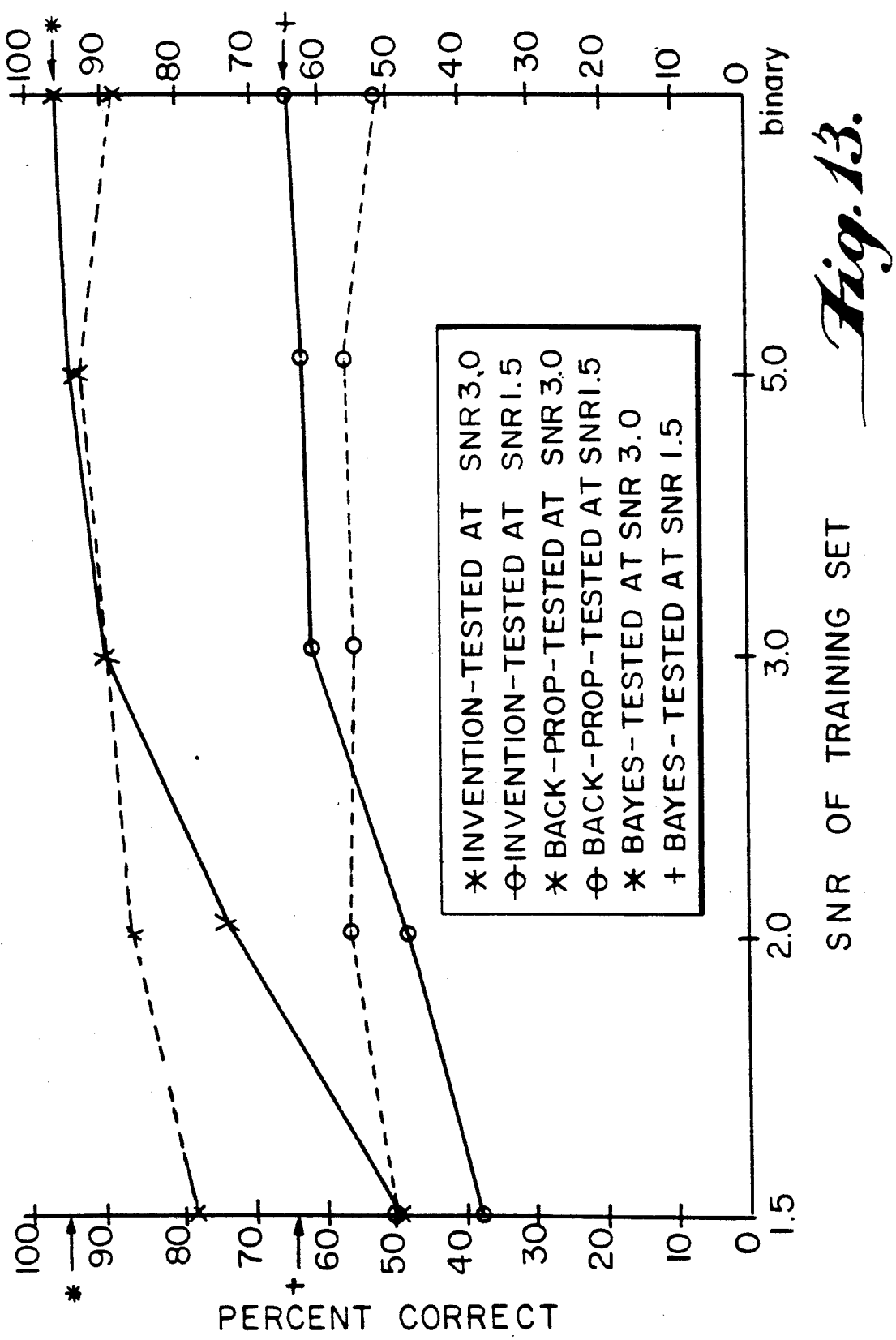
FIG. 13 is a graphical illustration of the performance of the generalized network.

FIG. 13 presents the network's performance at classification as a function of the signal-to-noise ratio of training set for the two testing sets (SNR=1.5 and SNR=3.0). For comparison, the performance of a two-layer back-propagation network (with eight hidden units) on the same task is illustrated. For the network, the points represent average values over five trials in which a different random presentation order of training patterns was used. The network does not require random starting weights, and for these experiments all weights were initialized to 0.0. For back-propagation, the points represent average values over five trials in which a different set of randomly chosen initial weights are used.

As can be seen in FIG. 13, the network's performance improves monotonically as the signal-to-noise ratio of the training set increases, a well known characteristic of Pavlovian learning in animals. The performance of the network, when trained with noise-free images and tested with noisy images, was essentially equal to that of the statistically ideal Bayesian classifier (with a priori knowledge of the statistics of the distributions). They both achieve 96 percent correct classification on SNR=3.0 images, and 64 percent correct classification on SNR =1.5 images.

In order to evaluate the effect of network parameters on performance, the network's ability as a pattern restorer was tested for many different combinations of parameters. The network was auto-associatively trained using various values of learning increments and decrements, maximum weight on patches, patch creation thresholds, threshold and saturation of element input/output functions and spontaneous activity of interneurons and output neurons. Each trained network was tested with the 3000 noisy test patterns and performance was quantified as percent of improvement in pattern appearance.

Figure 14:
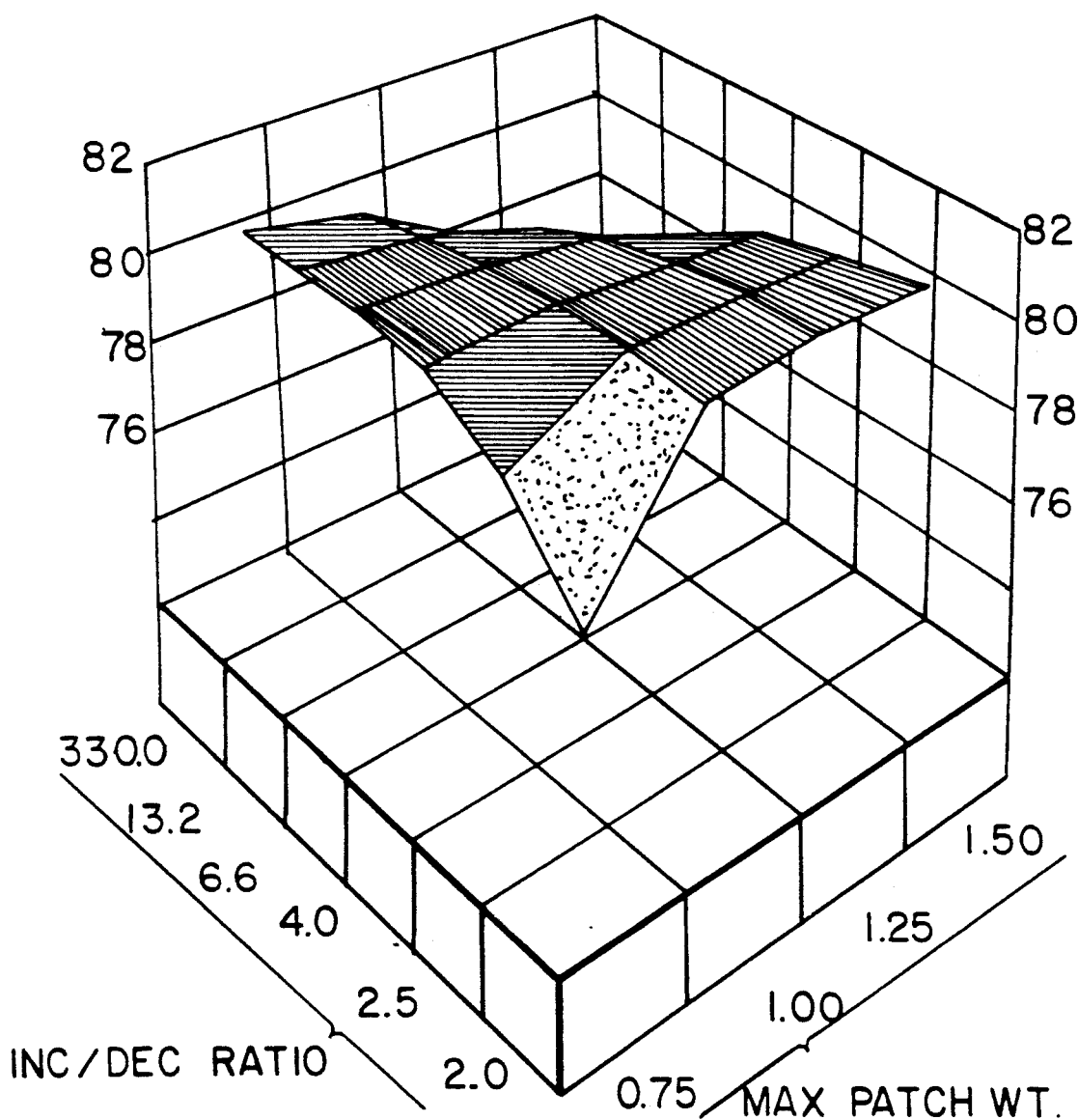
FIG. 14 is a 3-dimensional representation of the affect of various parameters on the generalized network.

The network was relatively insensitive to values of ratio of learning increment to decrement, or to the maximum weight on patches, as shown in FIG. 14. The percent improvement in pattern appearance varies less than 3 percentage points for maximum patch weight ranging from 0.75 to 1.5 and for increment to decrement ratio ranging from 13.2 to 2.0. FIG. 14 also shows that a change in maximum patch weight may be compensated by a change in increment-to-decrement ratio. The network was also insensitive to the magnitude of the learning increment or decrement. An increase in learning increment, while keeping the ratio of learning increment to decrement constant, increases the size of individual weight changes and thus increases the importance of any particular association and hence for binary data will decrease the number of presentations required for learning. Low values of the learning increment are advantageous with noisy data to avoid spurious weight changes on the basis of chance associations.

It has been found that neural networks constructed of neuron circuits employing the learning rule of the present invention learn more quickly than those of the prior art. The typical neural network of the prior art requires many times more iterations than the present invention to learn an association.

Figure 15:
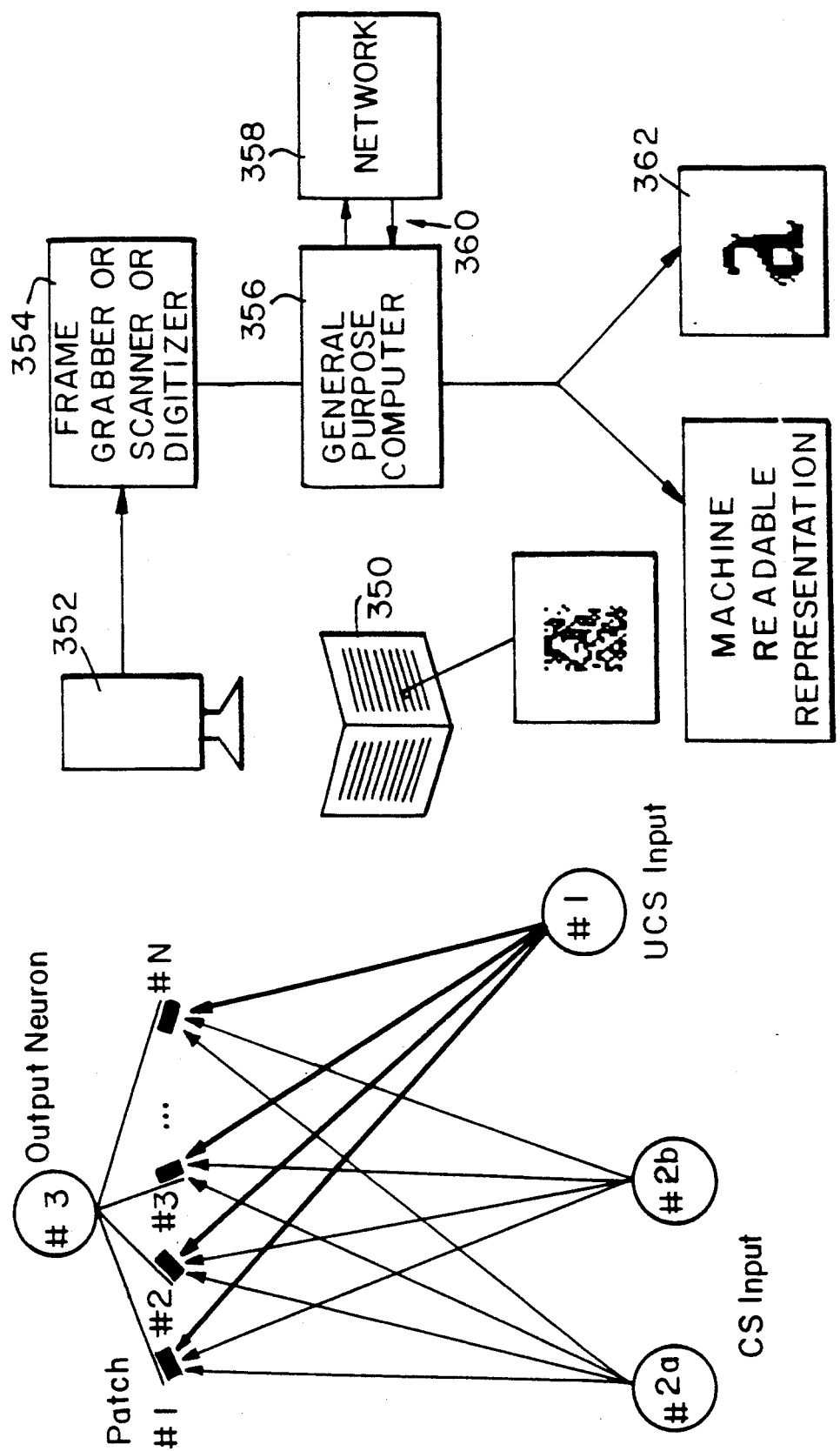
FIG. 15 illustrates a further extension of the neural network in accordance with the present invention.
Figure 16:
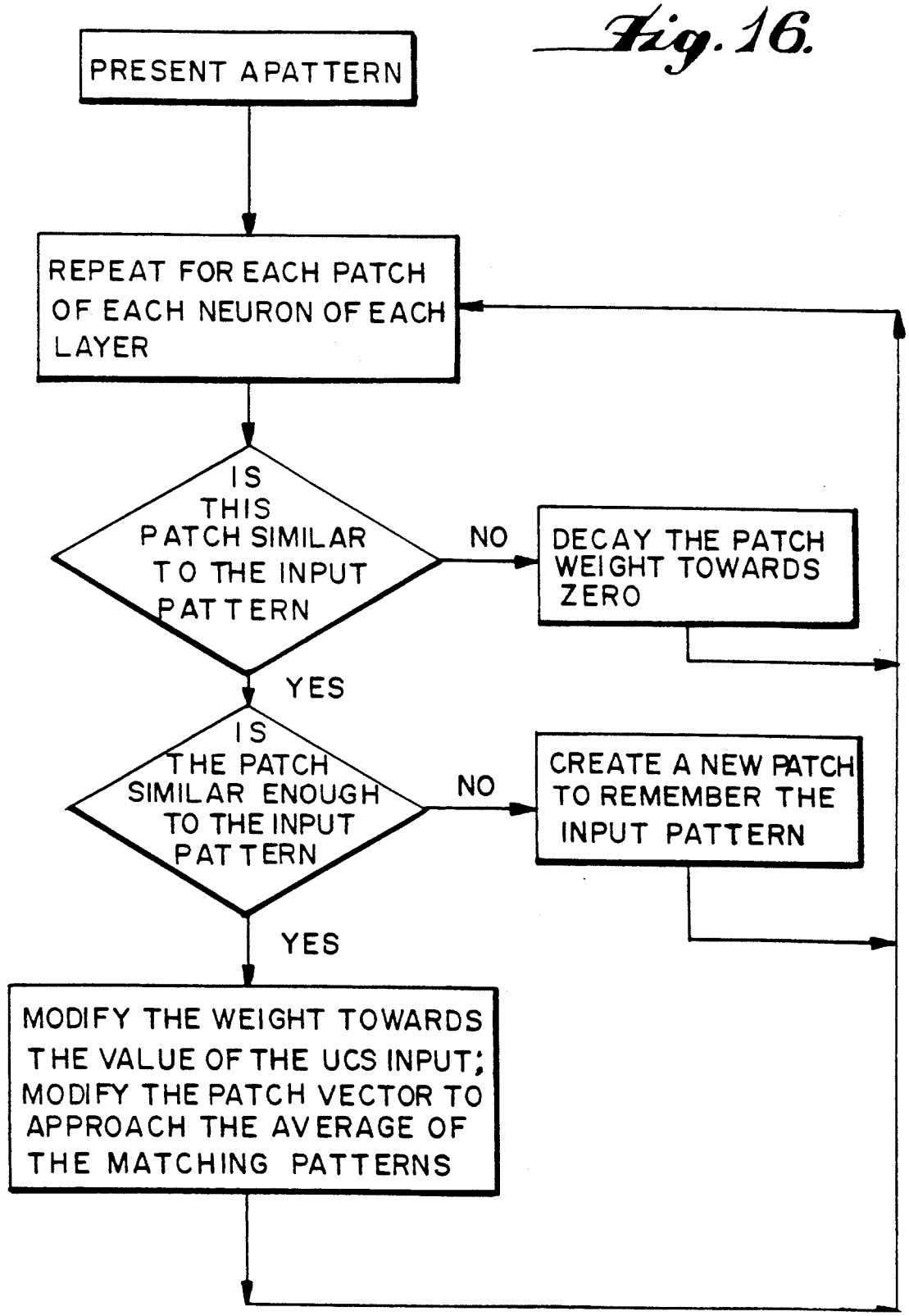
FIG. 16 illustrates a flow diagram for modification of the patch weights of FIG. 15 as a function of the computed similarity between an input pattern and the existing patch value.

A further embodiment of the present invention is shown in FIGS. 15 and 16 in which patches are assigned to all connection paths. As shown in FIG. 15, neuron 1 is the unconditioned stimulus (UCS) input, neurons 2a and 2b are the conditioned stimulus (CS) inputs, and neuron 3 is the output neuron. In contrast to the embodiment of FIG. 11, there are no interneurons or the indirect connections associated with the interneurons. Each conditioned stimulus input neuron and each unconditioned stimuli input neuron of the network makes a direct connection with each patch. Although only 4 patches are illustrated, the maximum number of different patches is $n^2$, where n is the number of bits used to store the value of each patch component vector (in contrast to the binary-valued vector of the embodiments of FIGS. 10-12). There is a geometrically specific connection between each conditioned stimuli input and the patch component; the method of choosing patches entails using a geometrically specific "similarity measure" to compute the patch most similar to the conditioned stimuli input signal.

In contrast to the above-described embodiments, in the implementation of FIGS. 15 and 16, the value of the patch vectors are no longer stored as a binary ON/OFF approximation to the learned pattern; more that one bit (i.e., a two, four, or eight bit word) per vector component for the conditioned stimuli input connections is stored. Each output neuron may be fully connected (i.e., have a receptive field that includes all input elements), or it may be connected to each of a subset of input elements, or the receptive field may consist of a group of individual input elements together with connections that transmit the average of groups of input elements to each patch. The receptive field may be defined by the user, depending upon the application.

As illustrated by the flow diagram of FIG. 16, an input pattern is presented to the network (as explained below in the context of FIG. 17) and for each neuron of each layer of the network a multi-bit similarity value is determined with the similarity value having a range of $-1$ to $+1$ in accordance with Pearson's R, for example.

The similarity value is then tested to determine the degree of similarity. If the similarity value between the input pattern and the patch under consideration is low, i.e., indicating a not-similar condition, the value of the patch weight is reduced in the direction of zero (no correlation). If the similarity value is above a 'similar enough' value, the weight of the patch is modified towards the value of the unconditioned stimulus input and the patch vector is modified to approach the average value of a set of predetermined matching patterns. Conversely, if the similarity value is not 'similar enough', a new patch is created to remember the input pattern.

The value content of each patch vector is modified after creation on the basis of subsequent inputs to more accurately reflect the additional information inherent in the presentation of additional similar patterns, and the learning rule for calculating the weight on the patch includes the storing of a moving average of the unconditioned stimuli signal to allow gray-scale values to be learned, distinguished, and reproduced more readily than in the above described embodiments.

In implementing the learning rule, the similarity between the patch vector and the input pattern is computed using a geometrically specific function (such as Pearson's R) of the stored patch vector and the input signal pattern transmitted by the direct connection so that the propagated signal is a function of the similarity between the patch vector and the input pattern. In the embodiment of FIG. 15, all patches above a similarity-measure threshold participate in signal propagation. This similarity-measure threshold removes the requirement that a single patch be selected as the "best" match to the incoming pattern. Lastly, the frequency of use of each patch vector is determined, and, where the frequency of use is below a limit, that patch vector is removed.

In the embodiment of FIGS. 15 and 16, four bit representations per component of the patch vectors are stored. As can be appreciated the number of bits can be easily increased: if m is the number of patch vector components and n is the number of bits used to store the value of each patch vector component, then the maximum number of different patches, N, that can be created is given by: $N = n^m$. The value of each patch is modified as a function of subsequent input values. Each patch vector is a moving average of patterns propagated by that patch allowing patch vectors to change results in patch vectors moving toward the mean of all patterns which are propagated through them. Thus, each patch vector becomes most similar to the mean pattern of a particular class or subclass of patterns. In practice, if several patches are permitted to propagate the signal simultaneously, it may be desirable to adjust the patch vector of only that patch to which the input is most similar.

In the previously described embodiments, a new patch was created if the similarity between the input signal and all previously created patches was not great enough. Once a patch was created, there was no mechanism for removing the patch vectors whose frequency of use was extremely low. In the embodiment of FIGS. 15 and 1 6, the frequency of use of each patch is maintained and a lower limit threshold established. If the frequency dependent weight is less than a particular value, indicating an extremely low frequency of use, then the patch is removed.

The contents of the patch vectors are modified after they have been created on the basis of the similarity or dissimilarity with subsequent inputs. The degree of similarity between a patch vector and an input pattern is computed using a geometrically specific function, such as Pearson's R, $$R_p^2 = \frac{\Sigma(X_{pi} - \overline{X}_p)(Y_i - \overline{Y})}{\sqrt{\Sigma(X_{pi} - \overline{X}_p)^2} \sqrt{\Sigma(Y_i - \overline{Y})^2}}$$

Pearson's R measures the correlation of variation of two vectors (or patterns) $X_p$ and Y; as applied to the embodiment of FIGS. 15 and 16, each conditioned stimuli input has a geometrically specific, direct connection to each patch. $X_p$ is the patch pattern for patch p and Y is the input signal pattern, transmitted by the direct connection. Therefore, no indirect connections or interneurons are needed or used for this similarity measure. The range of R is −1 to 1 inclusive, where a value of 1 indicates perfect correlation, a value of −1 indicates perfect negative correlation, and zero indicates no correlation. The patch selection rule is to choose the patch p whose $R_p$ is maximum. It is not necessary to choose just a single patch; a desirable alternative is to choose several patches all of whose $R_p$ is greater than some threshold value.

There are several advantages to using the correlation coefficient for a similarity measure. This measure works equally well with binary or gray scale images. Secondly, the correlation coefficient is independent of the mean level of the image because it is measuring variation. Thirdly, the correlation coefficient exhibits desirable properties with respect to inverse images (black on white instead of white on black or vice versa). Once a network is trained on a set of images, the network would recognize inverse images if the chosen patch is the one whose absolute value of $R_p$ were the largest. While Pearson's R has been presented as a desired geometrically specific function other similarity measures with similar properties exist that may be used for patch selection. Possibilities include the use of Gibbs statistics or other measures derived from the field of spatial statistics, moments about the central point of the receptive field, texture measures such as fractal dimensions, etc.

The propagated signal is a function of the similarity measure, e.g., the correlation coefficient. The two factors which determine the strength of the propagated signal, S, are the correlation coefficient, $R_p$, and the patch weight $W_p$:

$$S = R_p * W_p$$

The correlation coefficient in the equation for the propagated signal replaces the term for the sum of the conditioned stimuli inputs that best match the patch pattern. For given patch weight, less correlated patterns are propagated less strongly, resulting in an output closer to neutral gray, regardless of the strength of the incoming signal.

Consistent with Pearson's rule, the input and output values range are rescaled from =1 to 1. If the correlation between a patch and an input pattern is low (R is close to zero), the output will be close to zero. Alternatively, for purposes of storing the input values on the computer as 8 bit words, the input and output values may have 256 values ranging from 0 to 255.

In the embodiments of FIGS. 1-9 and 10-14, the patch weight was a function of the frequency of patch use and a binary approximation to the value of the flow-through neuron. The value of the flow-through neuron affected weight of the patch, either 1 or −1. In order to enhance gray-scale learning of the embodiment of FIG. 15, the patch weight is a function of both the frequency of patch use and the actual value of the flow-through neuron (rather than a binary approximation). In accordance with this enhancement, the patch weight is made the product of a frequency dependent weight value and a moving average of the flow-through value:

$$W_p = W_F * FT_{avg}$$

$W_F$ is calculated in the same fashion as the patch weight as described above for the embodiments of FIGS. 1-14 with the constraint that the maximum weight equals 1. Rather than assign the instantaneous value of the flow-through to the maximum weight, a moving average of the flow-through value is used. The use of the moving average prevents large fluctuations in the value of the patch weight when the unconditioned stimuli signal contains noise. After training, a perfectly matched pattern will take on the value of the flow-through neuron.

Because of the enhanced learning capability of the embodiment of FIGS. 15 and 16, accurate learning, recognition and reconstruction of gray value inputs are possible. Applications to binary derived images include tasks such as hand written/printed alphanumeric character recognition for reading zip codes, checks, or charge account receipts; recognizing silhouettes of objects of military interest, finger prints, etc. The gray-scale capabilities make the embodiment of FIGS. 15 and 16 an attractive candidate for solving problems of automatic target recognition in radar, infrared, and visible images; recognition of human faces for security systems; cell pathology identification (e.g., Papinicoulos smears); crop identification from aerial and satellite pictures; non-linear control applications such as aircraft-/helicopter stabilization; interpretation of electronic intelligence; battlefield surveillance and tactical image recognition; identification and classification of voice, sonar, and other time varying waveforms (e.g., electrocardiograms); etc.

An exemplary implementation in an image recognition context is shown in FIG. 17 in which an exemplary input pattern in the form of text 350 is presented to a video camera 352 with the image frame digitized at 354 and presented in digital form to a computer 356, which, in turn, presents the digital input value as the input to the neural network 358 connected to the computer 356 via input/output busses 360. The neural net 358, having been previously trained, propagates a signal that most closely matches the input to provide an output, such as the letter "a" as shown at 362.

The present invention eliminates the need for an external teacher, and there is no need for feedback of some output parameter or error measure in order for the network to learn an association.

Still another advantage of the present invention is the minimal constraints on architecture when it is embodied in neural networks. Because changes in synaptic weights are based solely on the signal history of synapses within the same receptive field of a neuron circuit, either excitatory or inhibitory connections can be made between layers of neuron circuits or within the same layer of neuron circuits without changing the method of teaching the neural network. Thus the learning rule does not affect the global connections of the network.

The explicit inclusion of time within the learning rule enables neural networks constructed with neuron-function circuits according to the present invention to associate arbitrary patterns. In the prior art, some external error measure was needed to facilitate the learning process. The only associations that could be made with global error measures were associations of all inputs to every other input. With the learning rule of the present invention, the network need not associate every input with every other input, but could associate differing patterns in differing portions of the input/output space. This can be achieved because different signals input on the same input lines at differing times change the weights in accordance with the present invention.

The present invention advantageously provides a dynamically stable associative learning neural network system that associatively learns both correlations and anti-correlations, that can be configured to classify or restore patterns simply by changing the number of output units, in which the computational effort scales linearly in complexity with the number of connections, and in which neither global nor local feedback connection are required during learning.

We claim:

1. A neural network comprising:

at least one conditioned signal input neuron and at least one unconditioned signal input neuron;

an output neuron connected to each said unconditioned signal input neuron along an unconditioned signal pathway having a fixed excitory weight associated therewith and said conditioned signal input neuron connected to each said output neuron along an conditioned signal pathway have a variable weight associated therewith;

means for defining a matrix of multi-bit digital weight values associated with each conditioned signal path, the weights having a normalized range of $-1$ to $+1$; and means for determining the degree of similarity between a matrices representative of an input signal pattern applied to at least each said unconditioned signal input neuron and said matrices or multi-bit digital weight values associated with each conditioned signal path and for increasing the weight along those conditioned signal pathways having a degree of similarity above a predetermined similarity threshold.

2. The neural network of claim 1, wherein said last-mentioned means decreases the weight along those conditioned signal pathways having a degree of similarity below a selected value.

3. The neural network of claim 1, wherein the degree of similarity is determined as a function of Pearson's R.

* * * * *